(12) United States Patent
Brandman et al.

(10) Patent No.: US 10,229,460 B2
(45) Date of Patent: Mar. 12, 2019

(54) SYSTEM AND METHOD FOR TELEMATICS BASED DRIVING ROUTE OPTIMIZATION

(71) Applicant: Hartford Fire Insurance Company, Hartford, CT (US)

(72) Inventors: Michael Louis Brandman, Milford, CT (US); Raphael Jermaine Thomas, West Hartford, CT (US)

(73) Assignee: Hartford Fire Insurance Company, Hartford, CT (US)

(*) Notice: Subject to any disclaimer, the term of this patent is extended or adjusted under 35 U.S.C. 154(b) by 789 days.

(21) Appl. No.: 14/313,210

(22) Filed: Jun. 24, 2014

(65) Prior Publication Data
US 2015/0371336 A1    Dec. 24, 2015

(51) Int. Cl.
*G06Q 40/08*    (2012.01)

(52) U.S. Cl.
CPC .................................... *G06Q 40/08* (2013.01)

(58) Field of Classification Search
CPC ...................................................... G06Q 40/08
See application file for complete search history.

(56) References Cited

U.S. PATENT DOCUMENTS

| | | | |
|---|---|---|---|
| 5,475,387 A * | 12/1995 | Matsumoto | G01C 21/3446 340/990 |
| 6,396,417 B2 | 5/2002 | Lee | |
| 6,989,766 B2 | 1/2006 | Mese et al. | |
| 7,123,926 B2 | 10/2006 | Himmelstein | |
| 7,398,076 B2 | 7/2008 | Kubota et al. | |
| 8,359,259 B2 | 1/2013 | Berg et al. | |
| 8,520,695 B1 | 8/2013 | Rubin et al. | |
| 8,538,785 B2 | 9/2013 | Coleman et al. | |
| 8,606,512 B1 | 12/2013 | Bogovich et al. | |
| 8,612,139 B2 | 12/2013 | Wang et al. | |
| 2006/0129313 A1 * | 6/2006 | Becker | G01C 21/3484 701/533 |
| 2006/0247852 A1 | 11/2006 | Kortge et al. | |
| 2007/0282638 A1 | 12/2007 | Surovy | |
| 2010/0214126 A1 | 8/2010 | Publicover | |
| 2011/0037619 A1 | 2/2011 | Ginsberg et al. | |
| 2011/0213628 A1 | 9/2011 | Peak et al. | |
| 2012/0123806 A1 | 5/2012 | Schumann, Jr. et al. | |
| 2012/0136567 A1 | 5/2012 | Wang et al. | |
| 2012/0166229 A1 | 6/2012 | Collins et al. | |
| 2012/0173290 A1 | 7/2012 | Collins et al. | |
| 2012/0226391 A1 | 9/2012 | Fryer et al. | |

(Continued)

OTHER PUBLICATIONS

U.S. Appl. No. 61/968,904, filed Apr. 4, 2014, Fuchs; Gil Emanuel.*

(Continued)

*Primary Examiner* — Kito R Robinson
*Assistant Examiner* — Shacole C Tibljas
(74) *Attorney, Agent, or Firm* — Howard IP Law Group

(57) ABSTRACT

In a computerized system, a route-based analysis may be performed relating to a commuting route for a customer of an insurance company. The insurance company may provide information to the customer based on the result of the analysis. The information may relate to an insurance policy premium quotation, or to suggested vehicle deceleration or acceleration to improve driving efficiency and/or safety.

14 Claims, 23 Drawing Sheets

(56) References Cited

U.S. PATENT DOCUMENTS

| | | | |
|---|---|---|---|
| 2013/0117048 A1* | 5/2013 | Bradshaw | G06Q 40/08 |
| | | | 705/4 |
| 2013/0187792 A1 | 7/2013 | Egly | |
| 2013/0282271 A1 | 10/2013 | Rubin et al. | |
| 2013/0304515 A1 | 11/2013 | Gryan et al. | |
| 2013/0345944 A1* | 12/2013 | Kasiraj | B60W 30/16 |
| | | | 701/96 |
| 2014/0046585 A1 | 2/2014 | Morris, IV et al. | |
| 2016/0189303 A1* | 6/2016 | Fuchs | G01C 21/3484 |
| | | | 701/533 |

OTHER PUBLICATIONS

"Routing Server." Waze, Mar. 21, 2014, web.archive.org/web/20140417195744/https://wiki.waze.conn/wiki/Routing_server. (Year: 2014).*

Petrany, Mate, "Audi's New Tech Can Turn Every Traffic Light in Front of You Green", Mar. 10, 2014 9:00am, Jalopnik, retrieved date Apr. 8, 2014, retrieved from http://jalopnik.com/audi-will-save-fuel-by-turning-every-light-green-in-fro-1540311906, 7 pages.

* cited by examiner

| | |
|---|---|
| | OK  CANCEL |
| | * INDICATES REQUIRED FIELD |
| 📎 ATTACH FILE | |
| Title * | [          ] |
| 706 — When do you leave for work? | [          ] |
| 708 — When do you return home from work? | [          ] |
| 710 — What days of the week do your commute? | ☐ Sunday<br>☐ Monday<br>☐ Tuesday<br>☐ Wednesday<br>☐ Thursday<br>☐ Friday<br>☐ Saturday<br>☐ Irregular/It changes |
| 702 — Is the address you inputted earlier (present address) the primary address from which you leave for work? If no, please enter a new address. | ⊙ Yes ▾<br>○ Specify your own value: [   ] |
| 704 — Is the employer address you inputted (present employer address) the primary destination of your commute? If not, please provide a new address. | ⊙ Yes ▾<br>○ Specify your own value: [   ] |
| How soon do you anticipate this information changing? I.e., are you moving? Is your job moving? | Less than 1 month ▾ |
| 712 — Do you work on Federal Holidays? | ☑ |
| 714 — Is working from home an option during extreme weather? | ⊙ Yes, and it happens frequently<br>○ Yes, but it happens infrequently<br>○ No, it is not an option |
| | OK  CANCEL |

*FIG. 7*

| INCIDENT TYPE | INCIDENT START TIME | INCIDENT END TIME | INCIDENT DATE | INCIDENT SEVERITY | INCIDENT DAY TYPE | LOCATION |
|---|---|---|---|---|---|---|
| AUTOMOBILE ACCIDENT | 8:27 AM | 8:57 AM | 8/27/2008 | 3 | NONHOLIDAY MONDAY | STREET ADDRESS |
| SNOW STORM | 7 PM | 11:59 PM | 10/23/2011 | 8 | HOLIDAY MONDAY | SHAPE FILE |
| SNOW STORM | 12 AM | 9 AM | 10/29/2011 | 7 | NONHOLIDAY TUESDAY | SHAPE FILE |
| SPEEDING TICKET | 4:28 PM | 4:43 PM | 5/24/2012 | N/A | NONHOLIDAY SATURDAY | STREET ADDRESS |

SYSTEM AND METHOD FOR TELEMATICS BASED DRIVING ROUTE OPTIMIZATION

FIELD

The present invention relates to computerized analysis of motor vehicle commuting routes.

BACKGROUND

A large portion of the driving of motor vehicles in the United States occurs in connection with commuting from home to work locations and back. The present inventors have recognized that there are opportunities via computerized analysis of commuting routes to recognize and/or reduce risks and/or to increase efficiencies relative to commuting by motor vehicle.

SUMMARY

An apparatus, method, computer system and computer-readable data storage medium are disclosed which include storing data that defines a commuting route for a customer of an insurance company, and performing a route-based computerized analysis of the commuting route. The apparatus, method, computer system and computer-readable data storage medium also include providing information from the insurance company to the customer based on a result of the route-based computerized analysis.

In some embodiments, the results of the computerized analysis are a factor in determining a quotation for an automobile insurance policy that the customer is shopping for online.

In some embodiments, the results of the computerized analysis are reflected in messaging to a driver during his/her commute to guide the driver to optimal driving behaviors.

Communications to insurance company customers based on commuting route analysis may enhance the marketing and/or loss avoidance efforts of the insurance company while also providing benefits to the customers.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIGS. 6 and 7 are example screen shots of displays that may be provided to an insurance company customer in connection with the process of FIGS. 5A/5B.

FIG. 15 is a simplified example risk incident data table of a kind that may be used in the process of FIGS. 5A/5B.

DETAILED DESCRIPTION

In general, and for the purposes of introducing concepts of embodiments of the present invention, an insurance company may store and analyze a customer's commuting route. The analysis may relate to potential risk factors related to the commuting route and/or to determining optimal driving tactics to maximize efficiency and/or safety while the customer is engaged in driving along the commuting route. To reflect the results of the analysis, the insurance company may provide information to the customer. The information may include a quotation for a premium for a proposed automobile insurance policy and/or guidance to the driver in operating his/her vehicle.

Figure 1:
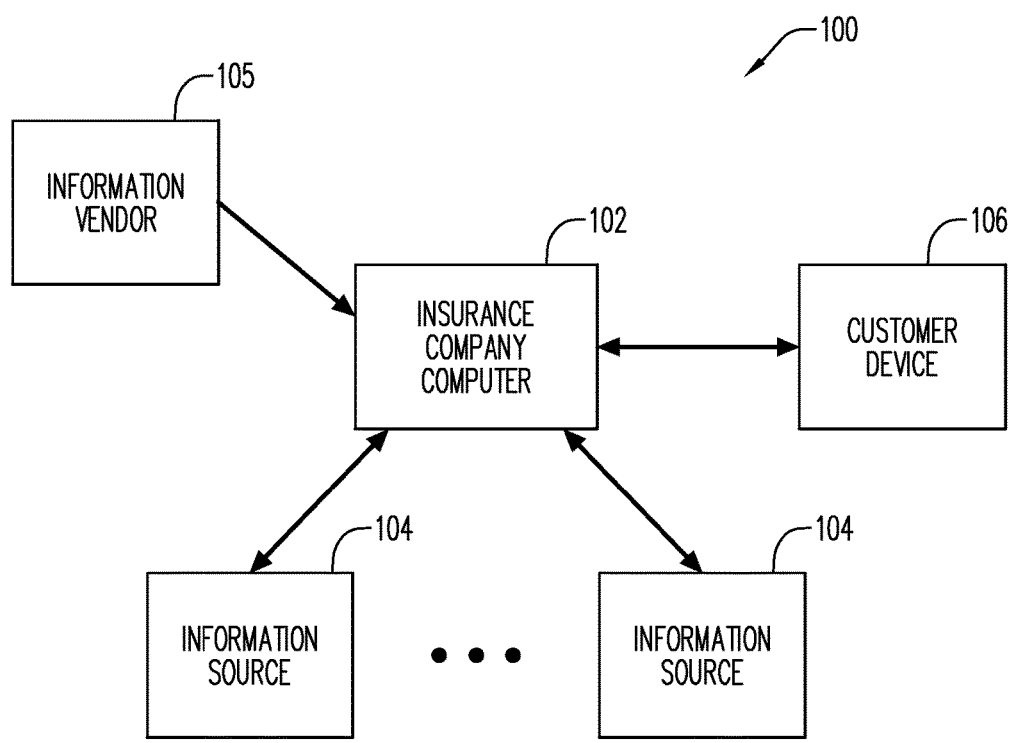
FIG. 1 is a high-level block diagram of a system provided according to aspects of the present invention.

FIG. 1 is a high-level block diagram of a system 100 provided according to aspects of the present invention. The system 100 includes an insurance company computer 102 that is operated by or on behalf of an insurance company. In embodiments disclosed herein, the insurance company is engaged in writing automobile insurance policies.

The system 100 also includes one or more information sources 104 that feed information to the insurance company computer 102. In some embodiments, the information sources 104 may include a road map atlas database and a database of risk incidents. In other embodiments, the information sources 104 may additionally or alternatively include data feeds as to traffic conditions, weather conditions, road conditions and/or current states and timing data for traffic signals.

As a supplement to the information sources indicated by blocks 104, the insurance company computer 102 may also receive data, such as dynamically provided telematics information, from an information vendor 105. For example, the information vendor 105 may receive current telematics information from dedicated telematics devices installed in vehicles and/or from other devices, such as software-modified versions of smartphones and/or GPS navigation units. In both cases, such devices may be present in vehicles that are currently being driven. The smartphones and/or navigation units may run suitable applications such that those devices perform at least some of the functions of dedicated telematics devices.

The system 100 is also shown in FIG. 1 as including a customer device 106 that is in data communication with the insurance company computer 102. Although only one customer device 106 is shown in FIG. 1, in practical embodiments of the system 100 there may be numerous customer devices that are simultaneously and/or sequentially in communication with the insurance company computer 102. In some embodiments, the customer device 106 may be installed in the customer's vehicle and may communicate with the insurance company computer via a mobile communication network (not shown in FIG. 1). In other embodiments, the customer device 106 may be a personal computer, a tablet computer, a smartphone or another device that runs a browser program to allow the customer device 106 to access websites via the internet.

Figure 2:
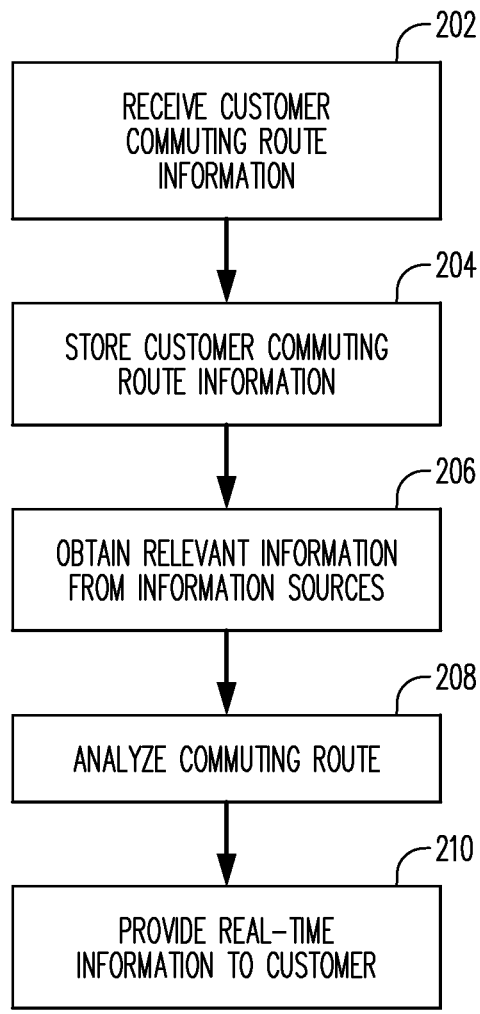
FIG. 2 is a high-level flow chart that illustrates a process that may be performed in the system of FIG. 1 according to aspects of the present invention.

FIG. 2 is a high-level flow chart that illustrates a process that may be performed in the system 100 according to aspects of the present invention. At 202 in FIG. 2, the insurance company computer 102 may receive information that indicates, defines or represents a customer's commuting route. The form in which the commuting route information is received may vary, and may be more or less complete. For example, in some embodiments, the information may simply indicate the starting and ending points of the commuting route. In other embodiments, the information may be rather complete, such that the route is defined turn-by-turn from the beginning of the commuting route to the end. (Even if only endpoints of the route are received, the route can still be considered to be defined by those endpoints.)

It should also be noted at this point that the term "customer" as used herein and in the appended claims refers both to individuals who are currently policyholders and/or insureds relative to an insurance company, and also to individuals who are seeking information or otherwise making efforts that may lead to their becoming policyholders and/or insureds.

At 204 in FIG. 2, the insurance company computer 102 may store the information received at 202. The information may be stored in the form in which it was received or may alternatively be modified, analyzed, summarized or otherwise transformed before being stored.

At 206, the insurance company computer 102 may obtain information relevant to the customer's commuting route. The information may be received from one or more of the information sources 104 as enumerated above in connection with FIG. 1 or may be other or additional types of information. The information may reflect past conditions and/or outcomes, and/or current conditions relative to the customer's commuting route.

At 208, the insurance company computer 102 may analyze the commuting route in view of the information stored at 204 and the additional information obtained at 206. Examples of the types of analysis that the insurance company computer 102 may perform will be discussed below in connection with further example embodiments of the system 100.

At 210, the insurance company computer 102 may provide real-time information to the customer based on one or more results of the analysis performed at 208. Examples of the types of real-time information provided at 210 will be discussed below in connection with further example embodiments of the system 100.

Figure 3:
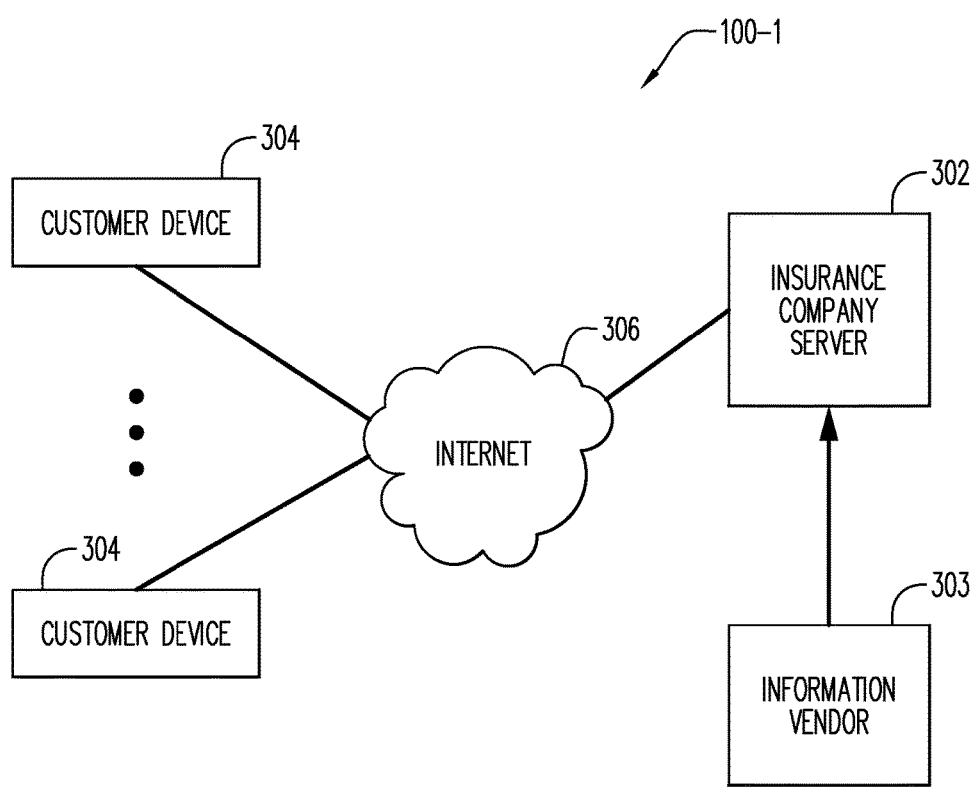
FIG. 3 is a block diagram representation of another embodiment of the system of FIG. 1.

FIG. 3 is a block diagram representation of a system 100-1 that is an example embodiment of the system 100 of FIG. 1. System 100-1 is provided in accordance with aspects of the present invention.

The system 100-1 includes an insurance company server computer 302. Details of the insurance company server computer 302 will be described below in connection with FIG. 4. Some of the functionality provided by the insurance company server computer 302 will be described below in connection with FIGS. 5A and 5B.

The system 100-1 also may include an information vendor 303, which serves as a source of information for the insurance company server 302. The information vendor 303 (which may in some embodiments include two or more such vendors) may for example provide access to a database of past weather-related information, and/or historical claim information, and/or data relating to risk incidents, as discussed below.

Also shown in FIG. 3 are customer devices 304, which may be in communication from time to time with the insurance company server computer 302 via the internet (reference numeral 306). As suggested above in connection with FIG. 1, some or all of the customer devices 304 may be conventional devices—such as personal computers, tablet computers, smartphones, etc.—that run browser software that enables the customer devices 304 to access websites via the internet. For the purposes of subsequently-discussed example processes, it will be assumed that the insurance company server computer 302 hosts a website for quoting automobile insurance policy rates and enrolling new automobile policyholders. Aspects of the manner in which the insurance company server computer 302 calculates policy rate quotations are performed in accordance with teachings of the present invention. It will also be assumed that the customer devices 304 are used by customers (including prospective policyholders) to access the website hosted by the insurance company e-commerce server computer 302.

Figure 4:
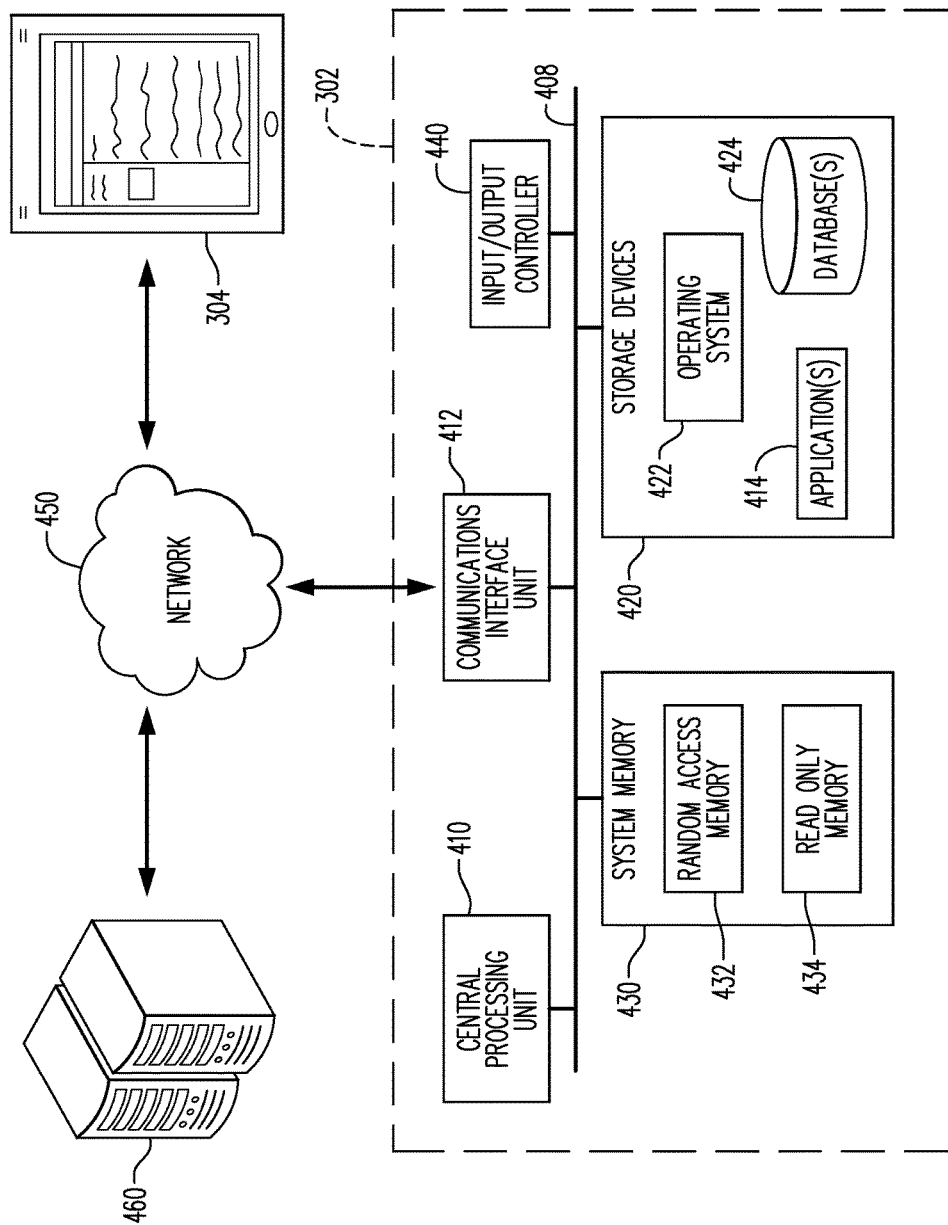
FIG. 4 is a block diagram representation of a computer that implements a portion of the embodiment of FIG. 3.

FIG. 4 is a block diagram representation of the insurance company server computer 302, together with other components of the system 100-1.

In the insurance company server computer 302, a central processing unit or processor 410 executes instructions contained in programs, including for example application software programs 414, stored in storage devices 420. The application software programs 414 may provide functionality as described herein to implement the insurance company server computer 302 and/or functionality of the insurance company server computer 302 as described herein. Processor 410 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 420 may include suitable media, such as optical or magnetic disks, fixed disks with magnetic storage (hard drives), tapes accessed by tape drives, and other storage media. Processor 410 communicates, such as through bus 408 and/or other data channels, with communications interface unit 412, storage devices 420, system memory 430, and input/output controller 440. System memory 430 may further include non-transitory computer-readable media such as a random access memory 432 and a read only memory 434. Random access memory 432 may store instructions in the form of computer code provided by an application 414 to implement teachings of the present invention. The insurance company server computer 302 further includes an input/output controller 440 that may communicate with processor 410 to receive data from user inputs such as pointing devices, touch screens, and audio inputs, and may provide data to outputs, such as data to video drivers for formatting on displays, and data to audio devices.

Continuing to refer to FIG. 4, storage devices 420 are configured to exchange data with processor 410, and may store programs containing processor-executable instructions, and values of variables for use by such programs. Processor 410 is configured to access data from storage devices 420, which may include connecting to storage devices 420 to obtain or read data from the storage devices, or place or store data into the storage devices. Storage devices 420 may include local and network accessible mass storage devices. Storage devices 420 may include media for storing operating system 422 and mass storage devices such as storage 424 for storing one or more databases, including one or more databases of customers' commuting routes and/or databases relating to past risk incidents.

Communications interface unit 412 may communicate via a network 450 with other computer systems or devices, such as the customer device 304 shown in FIG. 4, which may be considered to stand in for the customer devices 304 shown in FIG. 3. The network 450 thus may at least in part be constituted by the internet.

Continuing to refer to FIG. 4, the communications interface unit 412 may communicate with other servers and/or computer systems (reference numeral 460) that function as remote sources of data (such as the information sources 104 shown in FIG. 1, to the extent that such data sources have not previously been brought internal to the insurance company server computer 302 as databases 424 shown in FIG. 4). The insurance company server computer 302 may also be configured in a distributed architecture, wherein databases and processors are housed in separate units or locations. Some such servers may perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. The network 450 may be or include wired or wireless local area networks and wide area networks, and may be implemented at least in part via communications between networks, including over the Internet.

One or more public cloud, private cloud, hybrid cloud and cloud-like networks may also be implemented, for example, to handle and conduct processing of one or more tasks, transactions, operations or processes as described herein as aspects of the present invention. Cloud based computing may be used herein to handle any one or more of the application, storage and connectivity requirements of the insurance company server computer 302 and aspects of the present invention. For example, one or more private clouds may be implemented to handle web hosting, and data processing and storage in accordance with aspects of the present invention. Furthermore, any suitable data and communication protocols may be employed to accomplish the teachings of the present invention.

With reference still to FIG. 4, communications interface 412 is used for receiving and transmitting data related to access to the above-mentioned automobile insurance policy e-commerce website and response to such accesses. Processor 410 executes program instructions, such as program instructions provided by application(s) 414 to receive (via the communications interface 412) and to store (in database storage 424) the data relating to automobile insurance policy quotations.

Figure 5A:
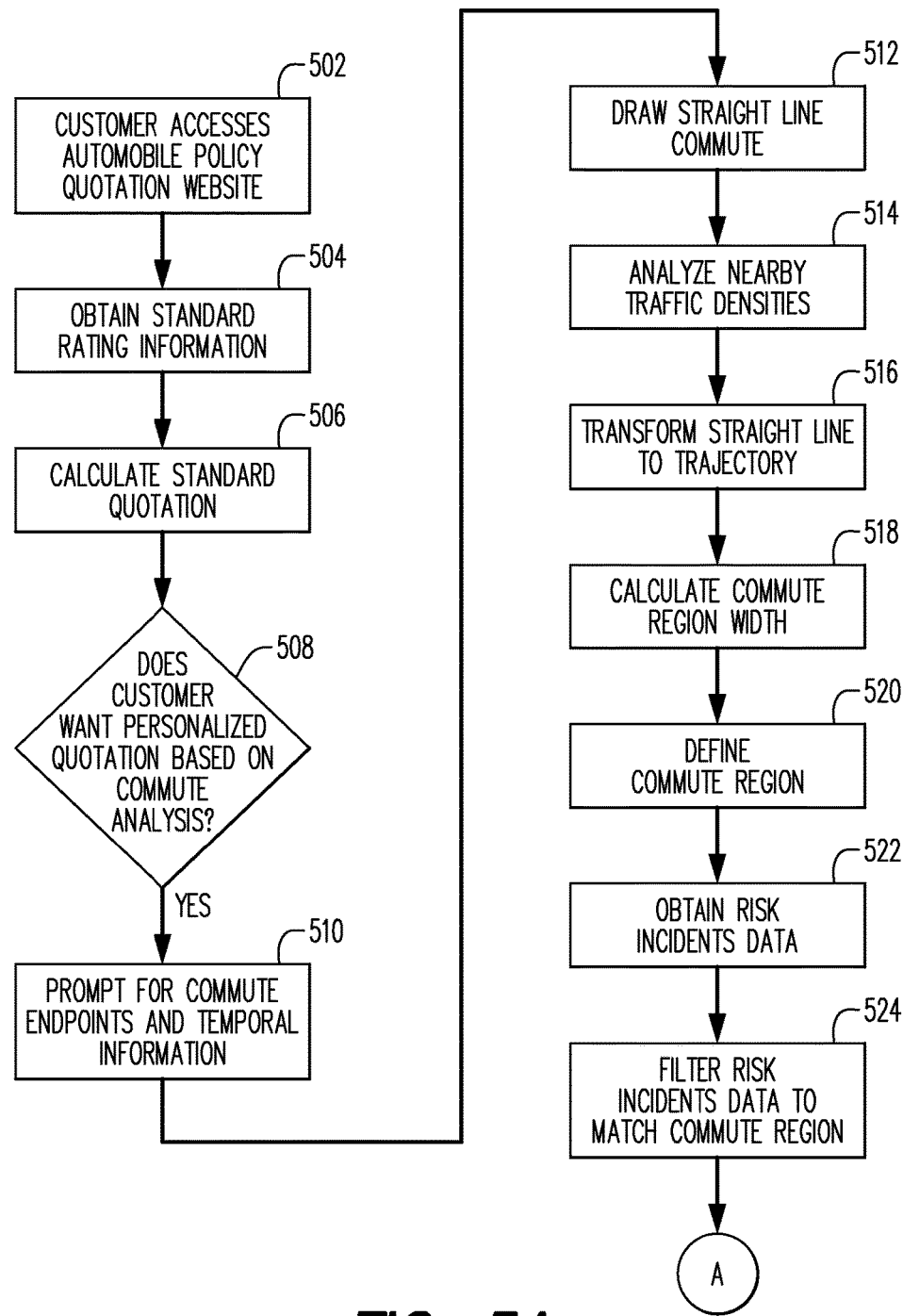
FIGS. 5A and 5B together form a flow chart that illustrates a process that may be performed in the embodiment of FIG. 3 according to aspects of the present invention.
Figure 5B:
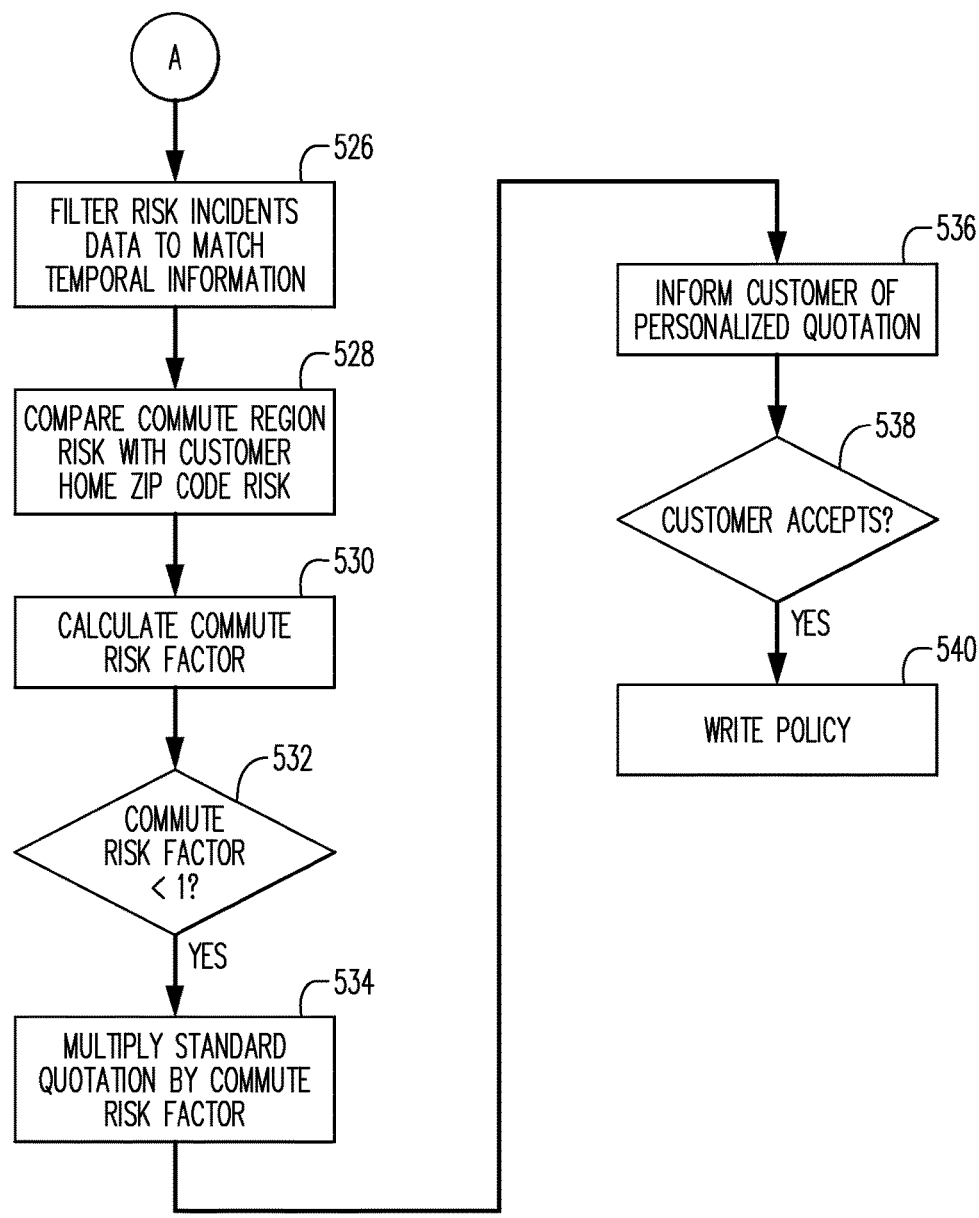

FIGS. 5A and 5B together form a flow chart that illustrates a process that may be performed in the insurance company e-commerce server computer 302 according to aspects of the present invention.

At 502 in FIG. 5A, a customer accesses the above-mentioned e-commerce website hosted by the insurance company server computer 302. The customer may do so by operating his/her customer device 304.

At 504, the insurance company server computer 302 may operate in a conventional manner to obtain customary automobile insurance policy rating information from the customer. Such information may include, for example, demographic information (e.g., age, gender) about the customer and may also indicate whether the customer is currently employed and if so, by whom. The information obtained from the customer at 504 may also include the make, model and year of the vehicle to be insured, as well as an indication as to whether the vehicle is owned or leased. Further information to be obtained from the customer may include indicating whether the vehicle is to be used for pleasure, business or commuting, and what number of miles the customer typically drives per year. Further, the insurance company server computer 302 may also obtain the garaging location for the customer's vehicle. The insurance company server computer 302 may also obtain, in a conventional manner, information relating to prior risk incidents—such as motor vehicle accidents or moving violation citations—involving the customer.

At 506, the insurance company server computer 302 may use the information obtained at 504 to calculate a premium quotation in a conventional manner in accordance with standard automobile policy rating principles.

Figure 6:
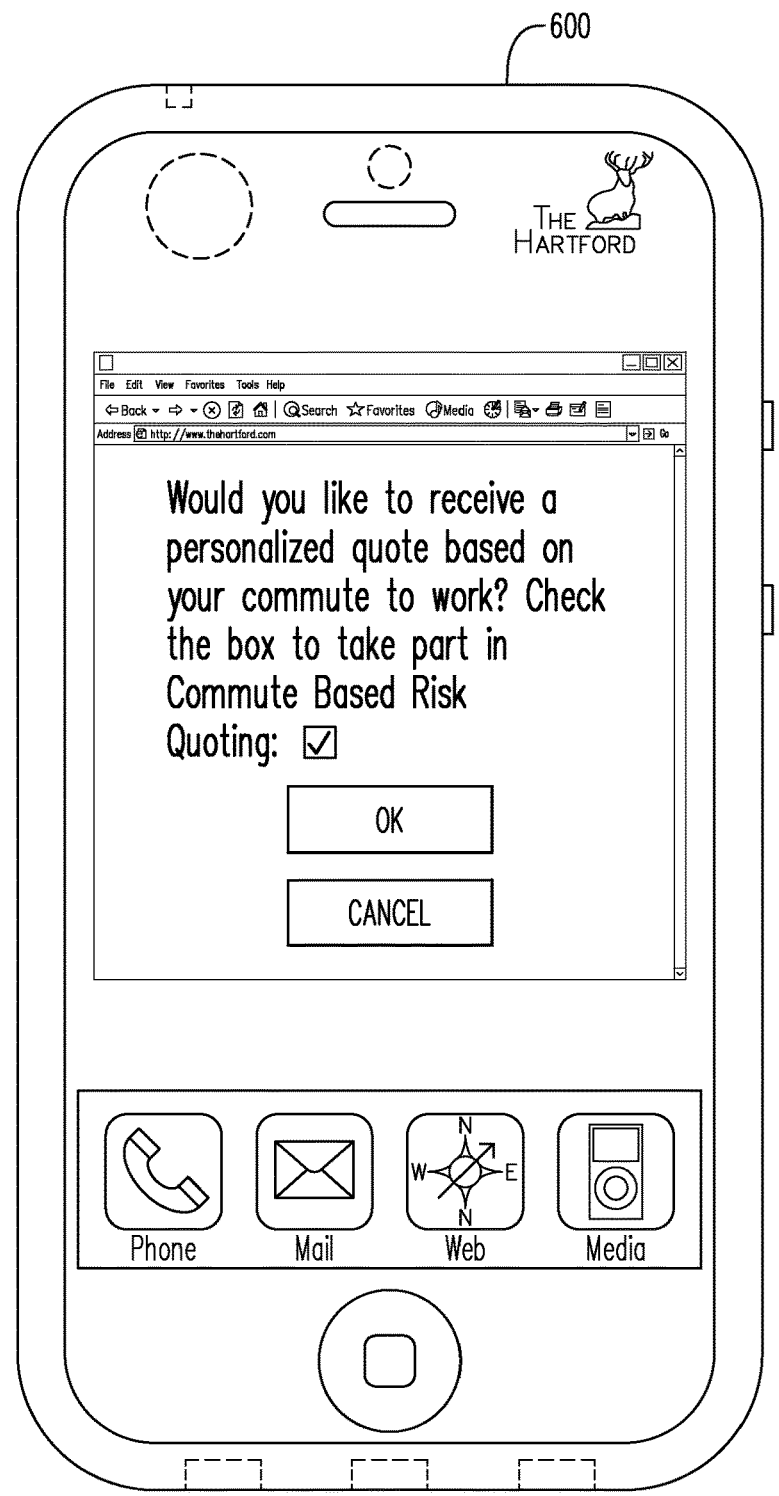

Following 506 in FIG. 5A is a decision block 508. At decision block 508, and in accordance with aspects of the present invention, the insurance company server computer 302 determines whether the customer wishes to receive a personalized premium quotation based on an analysis of the risks related to the customer's commuting habits. For example, the insurance company server computer 302 may pose a question to the customer—as to whether the customer desires a personalized quotation—by serving a webpage/display to the customer device 304 used by the customer to access the website. An example of such a display is shown in FIG. 6. For example, as seen in FIG. 6, the display in question may be presented on a smartphone 600, which the customer has used to access the insurance company website.

If the customer makes an affirmative response to such a question posed by the insurance company server computer 302, then the process of FIG. 5A may advance from decision block 508 to block 510.

At block 510, the insurance company server computer 302 may serve another webpage/display to the customer's device, as shown for example in FIG. 7. This display is a data entry form. For example, at 702 and 704, the customer is prompted to enter/confirm the endpoints of his/her commuting route (vehicle garaging location and the customer's work address). The display of FIG. 7 also prompts the customer to enter temporal information, such as times at which his/her morning and evening commutes occur (reference numerals 706, 708). At 710, the display prompts the customer to indicate the days of the week that he/she customarily commutes (i.e., additional temporal information). At 712, the customer is prompted to indicate whether he/she customarily works on national holidays (further temporal information). At 714, the customer is prompted to indicate how frequently (if at all) he/she works at home during extreme weather (still further temporal information). It should be understood, that the commuting hours information is "clock-related", the day of the week and holiday information is "calendar-related", and the information about working at home in bad weather is "event-related".

Figure 8:
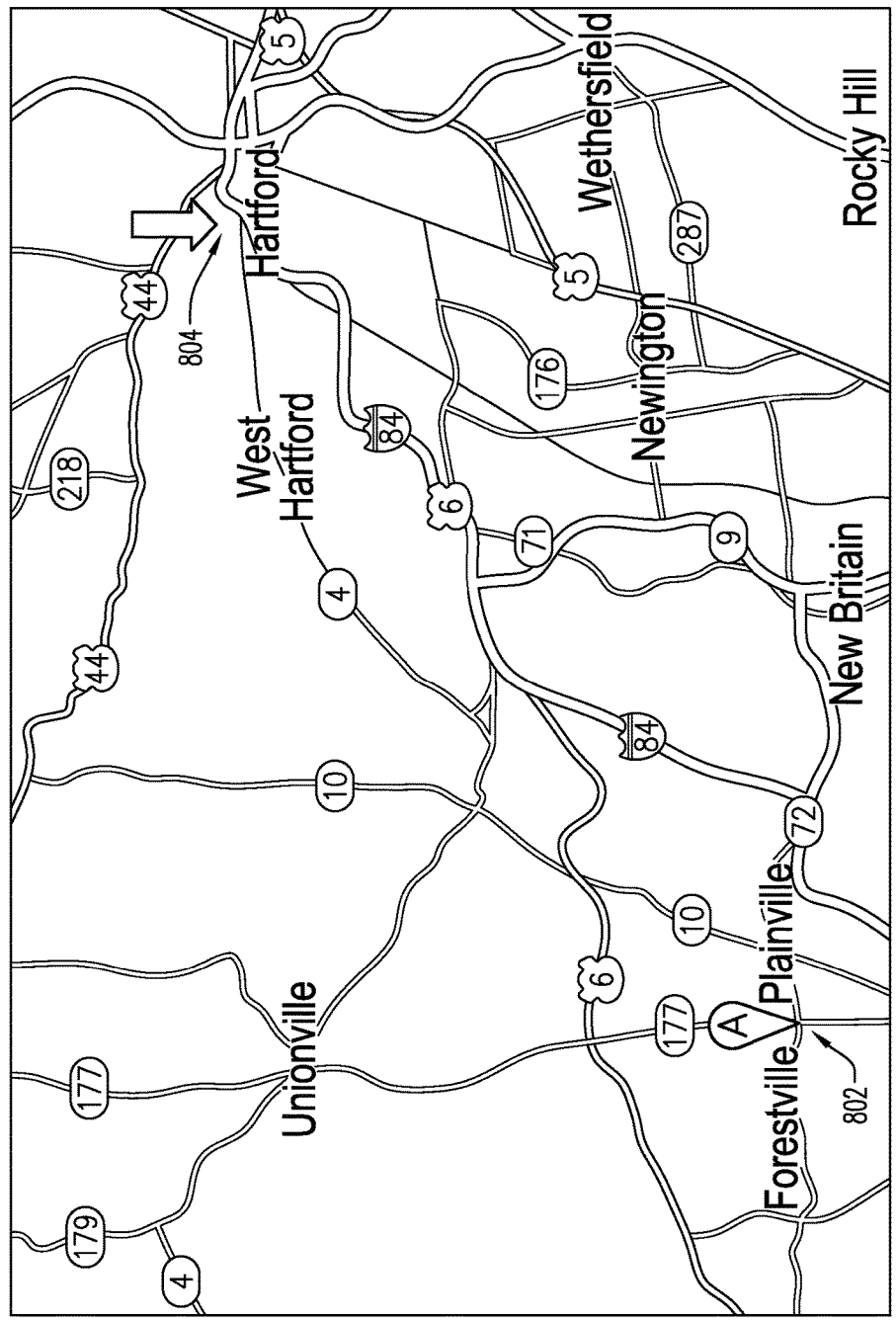
FIGS. 8-14 schematically illustrate analytical aspects of the process of FIGS. 5A/5B.
Figure 9:
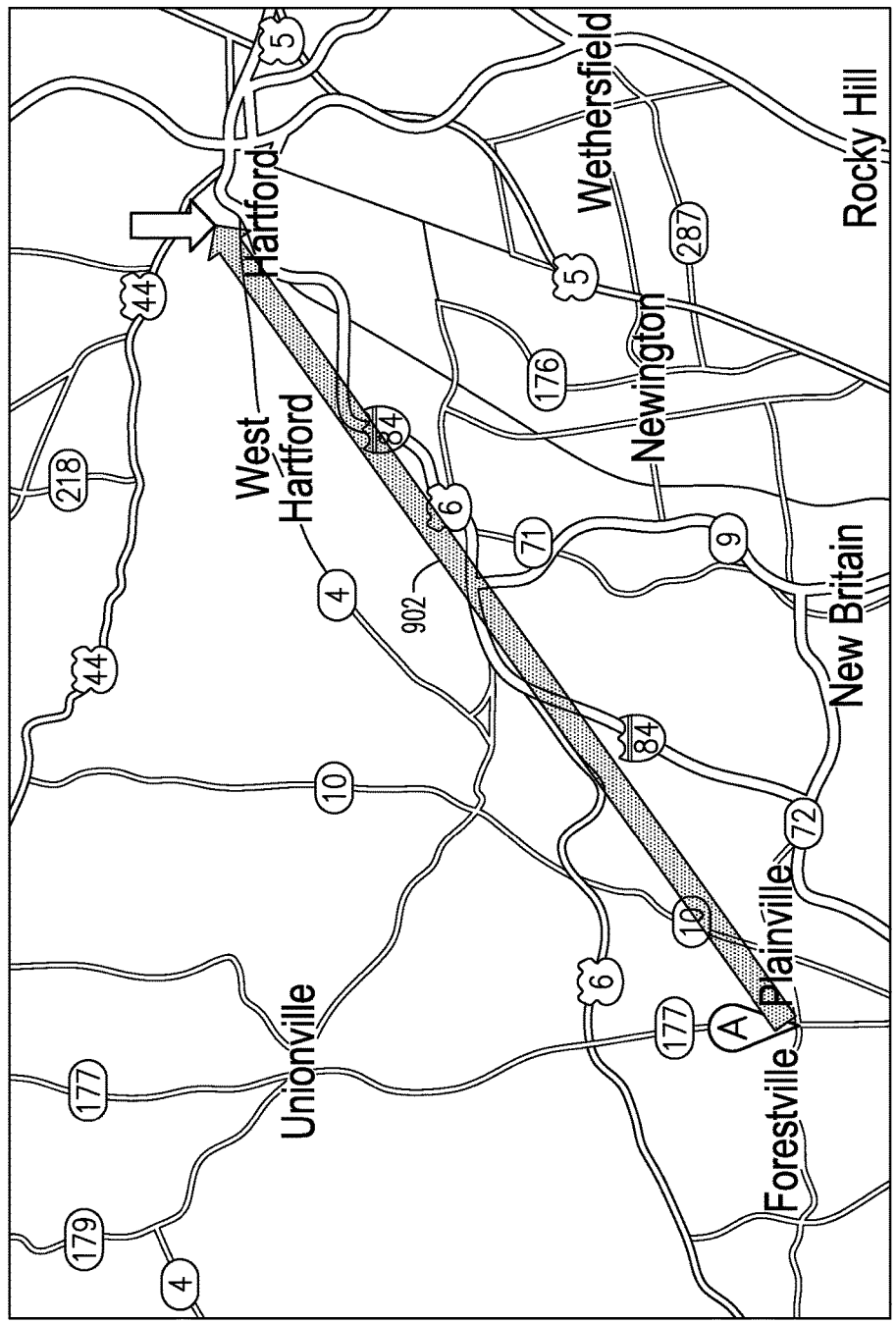

Assuming that the customer completes and submits the data entry form of FIG. 7, then block 512 may follow block 510 in the process of FIG. 5A. Based on that assumption, it is the case that the insurance company server computer 302 has obtained information indicating the endpoints of the customer's commuting route. These two endpoints are indicated at 802 and 804 in FIG. 8, which schematically illustrates an opening stage of the analysis of the commuting route by the insurance company server computer 302. According to the process stage represented by block 510, the insurance company server computer 302 initially represents the commuting route by defining a straight line (reference numeral 902, FIG. 9) between the endpoints. It will be appreciated that this process step may rely on highway atlas mapping data that is either made available to the insurance company server computer 302 from an external source or that is stored as a database internal to the insurance company server computer 302.

Next, at 514, the insurance company server computer 302 may analyze the traffic density characteristics of the areas nearby to the straight line 902 (i.e., characteristics of the spaces in between the commuting route end points). For example, the insurance company server computer 302 may analyze the density and/or vehicle carrying capacity of the roads passing through those spaces to determine which areas are most densely served with roads/vehicle travel lanes. This analysis step may rely on data from a standard roadmap database.

Figure 10:
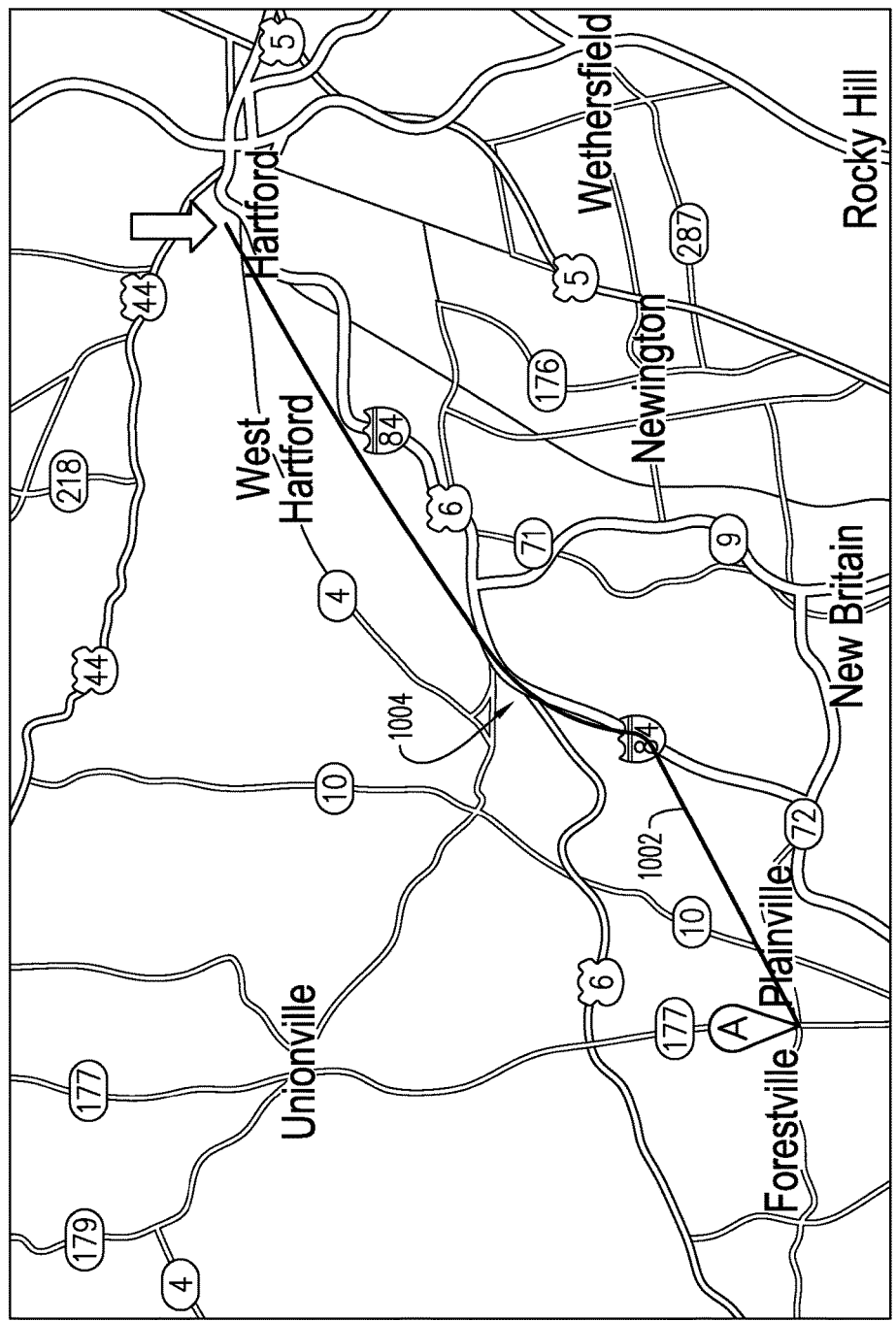

Following block 514 is block 516. At 516, the insurance company server computer 302 transforms the initial straight line path into a trajectory that is not a straight line. This may occur by bending the line toward areas of greater traffic density and away from areas of lower traffic density. An example of the resulting non-linear trajectory is indicated by reference numeral 1002 in FIG. 10. For example, at 1004 in FIG. 10, the trajectory bends to follow a multi-lane interstate highway.

In the process of FIG. 5A, block 518 may follow block 516. At block 518, the insurance company server computer 302 may calculate a width W to be used in defining a commute region for the customer. In some embodiments, the width W may vary depending on the length of the trajectory generated at block 514. For example, the width W may be greater for longer trajectories. There may be a formula, such as a nonlinear formula, for calculating the width W based on the length of the trajectory. In one embodiment typical values of W for various lengths of the trajectory may be, for example, W=0.25 mile for a trajectory that is one mile long; W=0.3 mile for a trajectory that is 5 miles long; W=0.4 or 0.5 mile for a trajectory that is 30 miles long. Other values of W are possible in other embodiments.

Figure 11:
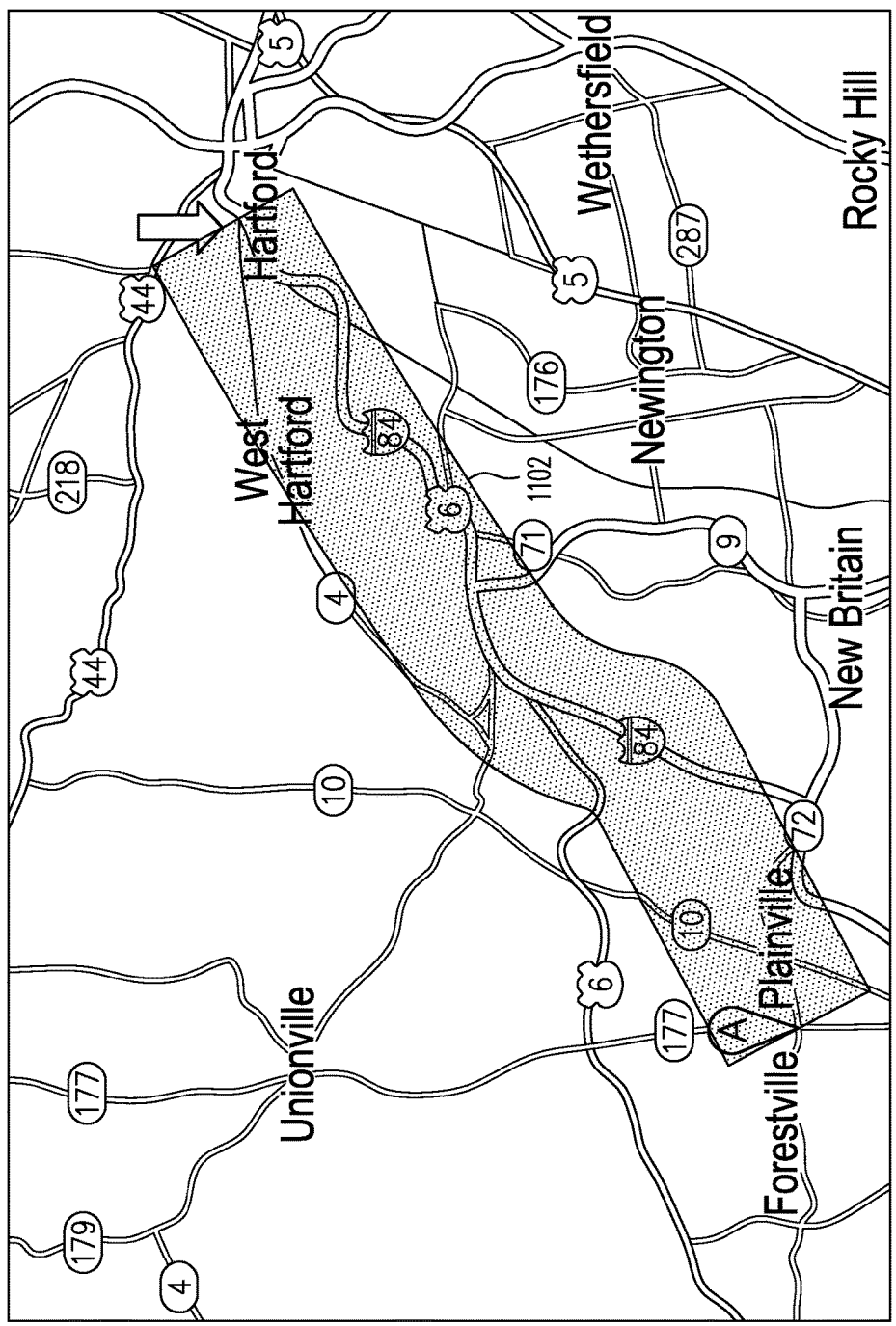

Block 520 may follow block 518 in the process of FIG. 5A. At block 520, the insurance company server computer 302 may define the commute region for the customer based on the trajectory generated at 516 and the region width W calculated at 518. For example, the commute region may be defined as all points on the map that (a) are no further than W/2 from the trajectory; and (b) are not beyond the endpoints of the trajectory. FIG. 11 shows a region 1102 that is defined in such a manner for the example trajectory 1002 shown in FIG. 10.

Defining a commute region as per block 520 and FIG. 11 may be a good approach for accommodating uncertainty as to the customer's exact commuting route and/or inherent variability in the customer's commuting habits that may occur due to, for example, avoidance by the customer of occasional traffic tie-ups, commuting route variations in response to weather conditions, side trips on the way to work or home, additional errands or shopping trips incorporated in the commute on some days, etc.

Figure 12:
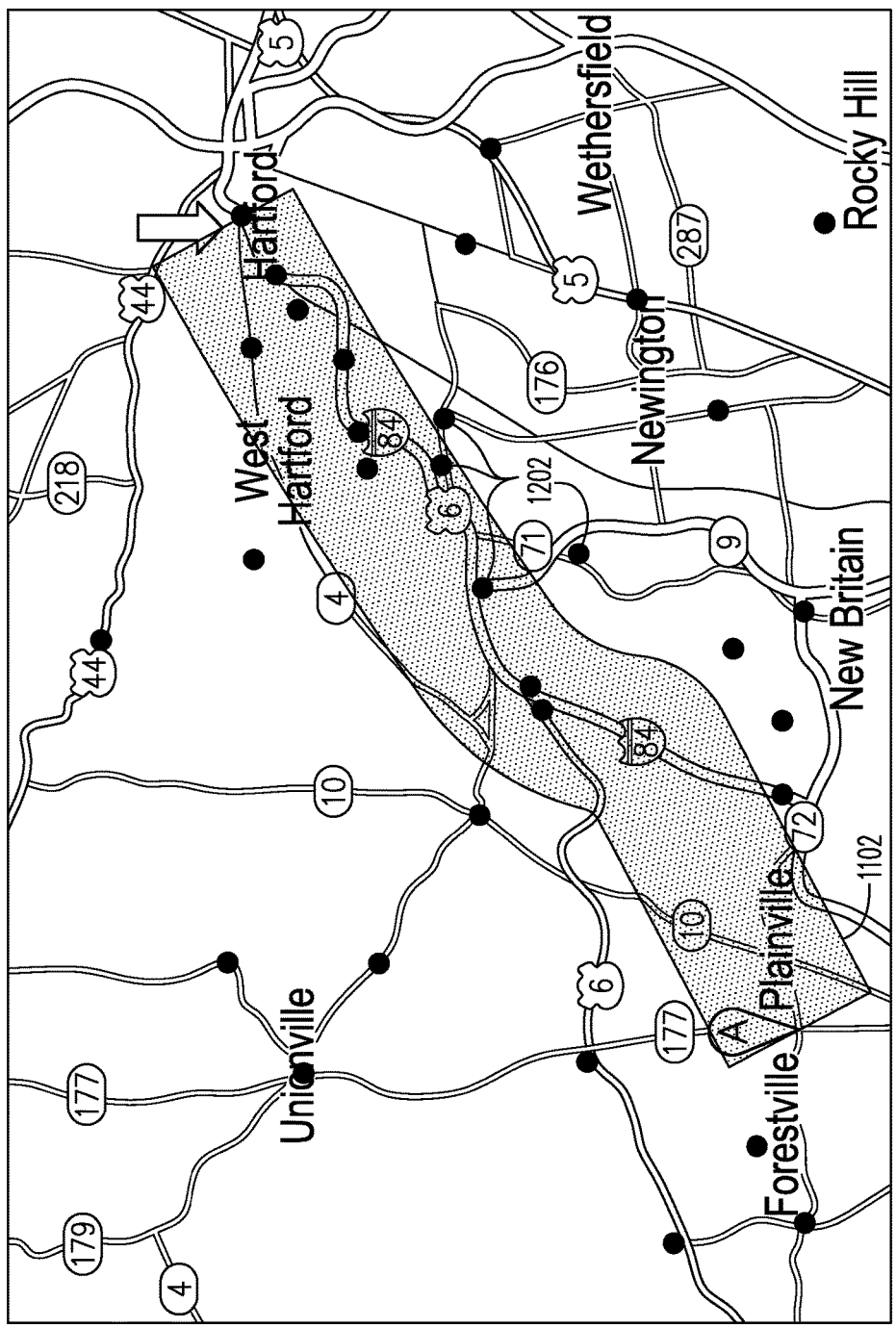

Block 522 may follow block 520 in the process of FIG. 5A. At block 522, the insurance company server computer 302 may obtain data indicative of risk incidents that have occurred in an area that surrounds the commute region 1102. For example, the insurance company server computer 302 may obtain data indicative of risk incidents in the county in which the commute region 1102 is located, and/or in a multi-county area that contains the commute region 1102. The data may reflect risk incidents that have occurred over a period of time in the past, such as the last five years. The risk incidents may include, for example, vehicle collisions (multi-vehicle or single vehicle), issuance of moving violation summonses, occasions of severe weather, etc. Sources of data for the risk incidents may include police records, insurance company records, historical claim data maintained by the insurance company and/or other insurance companies, insurance industry records, meteorological records, etc. FIG. 12 schematically illustrates locations of risk incidents represented by the data obtained by the insurance company server computer 302 at 522. That is, each dot (including example dots 1202) shown in FIG. 12 may represent the location of a risk incident in the commute region 1102 and in the surrounding area.

Figure 13:
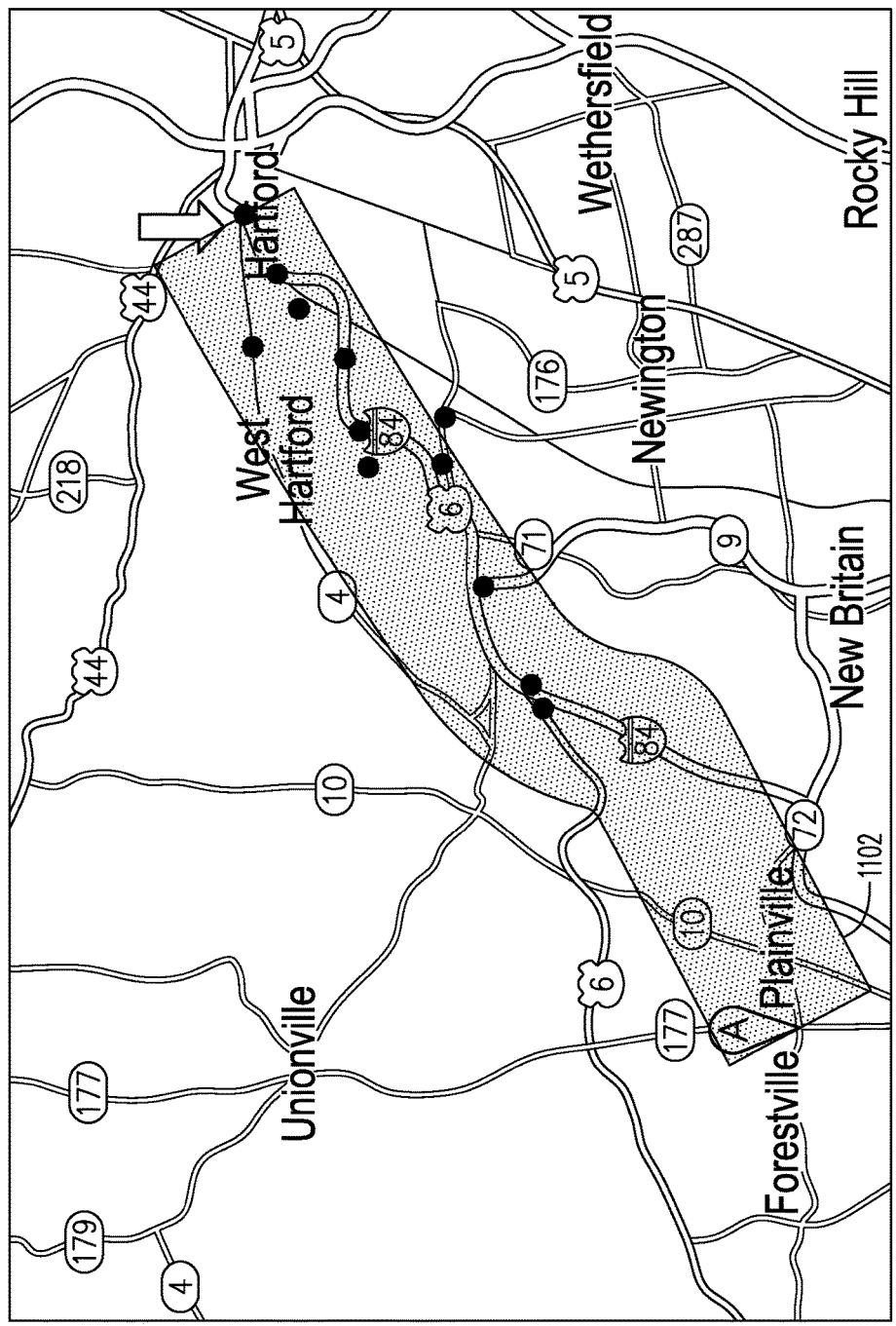

At 524 (FIG. 5A), the insurance company server computer 302 may filter the risk incident data obtained at 522 to exclude risk incidents that are outside of the customer's commute region. Thus, the insurance company server computer 302 may filter the risk incident data to match the commute region. FIG. 13 schematically illustrates the outcome of this filtering. From FIG. 13, it will be observed that all the remaining locations (dots) corresponding to risk incidents are located in the commute region 1102.

Figure 14:
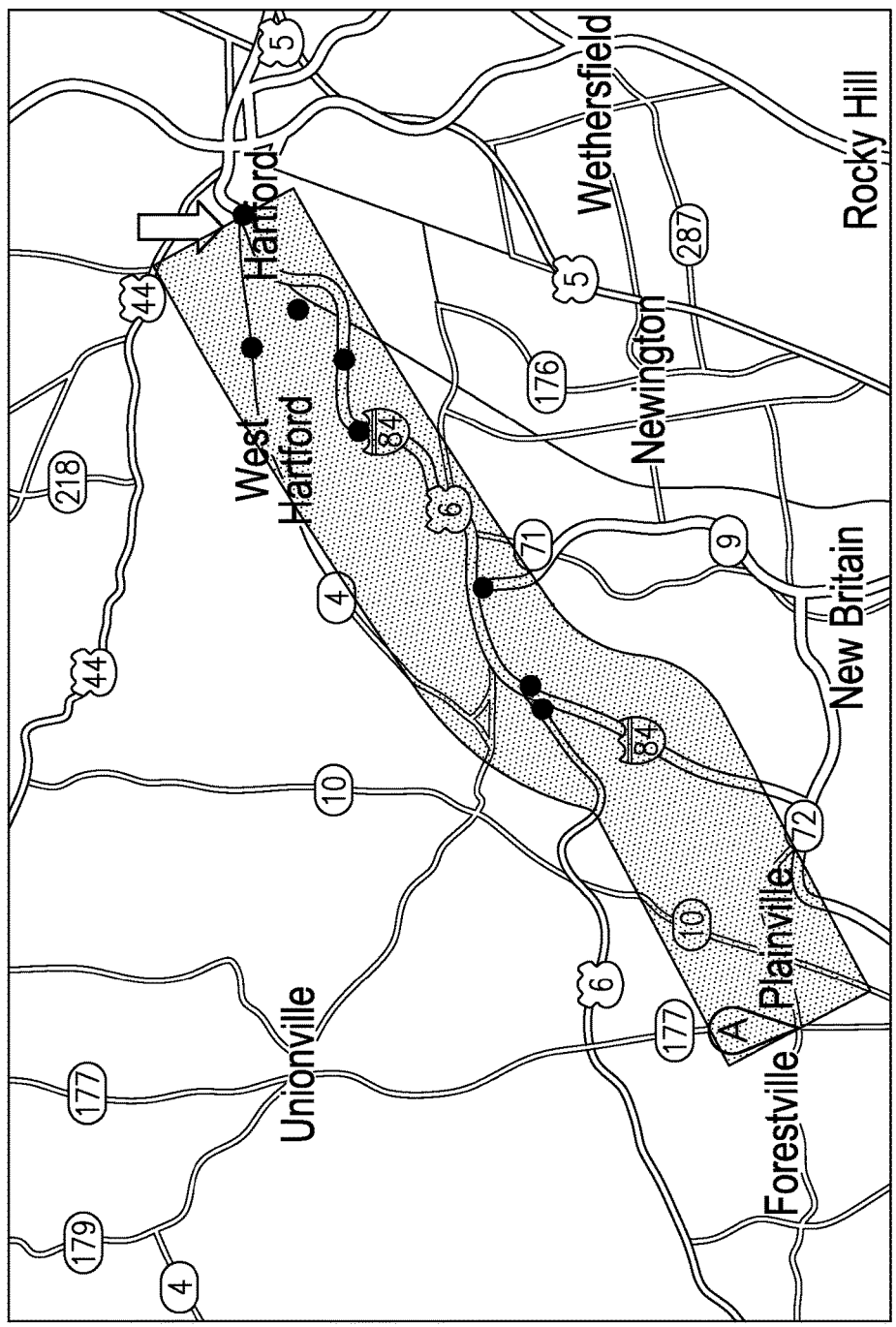

In the process of FIGS. 5A and 5B, the process flow may advance from block 524 in FIG. 5A to block 526 in FIG. 5B. At block 526, the insurance company server computer 302 may further filter the risk incident data remaining after the filtering process that occurred at 524. The further filtering at 526 may involve removing risk incidents that do not match the times when the customer typically commutes. Thus the filtering at 526 may match the risk incident data to the temporal information provided by the customer at 510 (FIG. 5A). In other words, at 526, the insurance company server computer 302 may exclude risk incidents that did not occur at times when the customer typically commutes. FIG. 14 schematically illustrates the outcome of the further filtering at 526. If FIG. 14 is compared with FIG. 13, it will be observed that some of the risk incident locations (dots) that were present in FIG. 13 are no longer present in FIG. 14.

In some embodiments, the temporal-related filtering may in part be indirectly related to the information provided by the customer concerning his/her habits in regard to working at home during severe weather events. For example, if the customer indicated that he/she "infrequently" works at home because of severe weather, then the process stage at 526 may filter out only the most severe weather-related risk incidents.

If the customer indicated that he/she "frequently" works at home because of severe weather, then the process stage at 526 may filter out both the most severe weather-related risk incidents as well as less severe weather-related risk incidents. If the customer indicated that he/she "never" works from home due to severe weather, then it may be the case that no weather-related risk incidents are filtered out, unless they occurred outside of normal commuting hours.

FIG. 15 is a simplified tabular representation of a set of risk incident data that may be filtered in the process stage 526 of FIG. 5B. Each line item in FIG. 15 represents a respective risk incident that occurred in the customer's risk region. Some of the risk incidents may be filtered out if they did not occur during a time period when the customer was typically commuting. It will be noted that a "severity" rating (column 1502) for each risk incident is present in the data set.

With the appropriately filtered commute-related risk incident data set resulting from process stages 522, 524 and 526, the insurance company server computer 302 may proceed to block 528 (FIG. 5B). At 528, the insurance company server computer 302 may compare the risk attributable to the customer's commute region with the risk attributable to the customer's home zip code.

As is known to those who are skilled in the art, it is a conventional approach in quoting an automobile insurance policy to use as a factor the risk associated with the customer's home zip code. This may have occurred in the process stage 506 referred to above to obtain the standard quotation for the requested automobile insurance policy. However, with process stages 510 through 526, the insurance company server computer 302 has the information available for an alternative risk assessment, namely one related to the customer's commute region. In some embodiments, the comparison of commute-related risk with home-zip-code risk at 528 may lead to block 530, at which the insurance company server computer 302 calculates a commute risk factor $RF_C$ according to the following formula (for example):

$$RF_C = (N_{IC} \times S_{IC}) \div (N_{IZ} \times S_{IZ});$$

where: $N_{IC}$=number of incidents in the customer's commute region;
$S_{IC}$=average severity of incidents in the commute region;
$N_{IZ}$=number of incidents in the zip code in which the customer resides; and
$S_{IZ}$=average severity of incidents in the zip code in which the customer resides.

In the process of FIG. 5B, a decision block 532 may follow block 530. At decision block 532, the insurance company server computer 302 may determine whether the commute risk factor $RF_C$ is less than the value 1.00. If so, this indicates that the apparent risk associated with the customer's commute is less than the apparent risk associated with the customer's home zip code. Accordingly, in underwriting terms it may make sense to offer the customer a discounted premium rate based on the commute risk factor $RF_C$. Thus, when the insurance company server computer 302 makes a positive determination at decision block 532, the process flow may advance from decision block 532 to block 534.

At block 534, the insurance company server computer 302 may multiply the standard quotation (generated at 506) by the commute risk factor $RF_C$ to produce a revised, personalized automobile policy premium quotation for the customer. Then, at 536, the insurance company server computer 302 may inform the customer of the personalized quotation. This may be done, for example, by the insurance company server computer 302 serving a page to the customer's device to indicate the amount of the quotation and to ask the customer whether he/she wishes to sign up for a policy on that basis. Accordingly, a decision block 538 may follow block 536. At decision block 538, the insurance company server computer 302 may determine whether the customer has indicated that he/she accepts the quotation. If so, then block 540 follows decision block 538. At block 540, the insurance company server computer 302 may take the necessary steps for the requested automobile insurance policy to come into effect, with billing, etc. to follow (and/or with payment by credit card via the insurance company's e-commerce website).

Referring again to decision block 508 (FIG. 5A), if at that point the customer does not request a personalized quotation, then blocks 510 and the following blocks are not performed. Instead the process follows a branch which is not shown, and in which the customer is offered a standard quotation, is given the opportunity to accept the quotation, and the process may lead to issuance of the requested policy in a conventional manner.

By the same token, in some embodiments, if a negative determination is made at decision block 532 (i.e., the commute-related risk is not more favorable than the home-zip-code risk), then in that case as well the customer may be offered a standard quotation, and the opportunity to accept the quotation, etc., in a conventional manner.

One advantage of the example process as illustrated in FIGS. 5-7 is that the customer is allowed to opt in to providing the commute-related information, and the amount of information to be provided by the customer is not extensive. This supports what is frequently considered an important goal for online insurance policy application processes, namely to minimize the amount of time and effort required from the customer. With the small additional effort requested from the customer by this example process, the insurance company may advantageously sharpen its underwriting of the policy and potentially offer a more favorable premium rate to the customer by using the commute-related information.

In other embodiments, the request for and use of commute-related information (per blocks 510 through 526) may be made a standard (and not optional) part of the online application and underwriting process. For example, in some embodiments, the commute-related risk assessment may take the place entirely of the conventional home-zip-code-based risk assessment.

In some embodiments, the commute-region definition and related risk assessment as described herein may be used in conjunction with a telematics-based rating discount program such as the "TrueLane" program offered by The Hartford insurance group, which is the assignee hereof.

In some embodiments of the process of FIGS. 5A/5B, the insurance company server computer 302 may receive telematics information in advance of the online rate-quote interaction with the customer to provide the end points of the customer's commuting route and/or other information about the customer's commuting route to the insurance company server computer 302. For example, the telematics information may be presented to the insurance company server computer 302 via a telematics application that runs on the customer's smartphone 600 while the smartphone is in the customer's vehicle during his/her commute.

Figure 16:
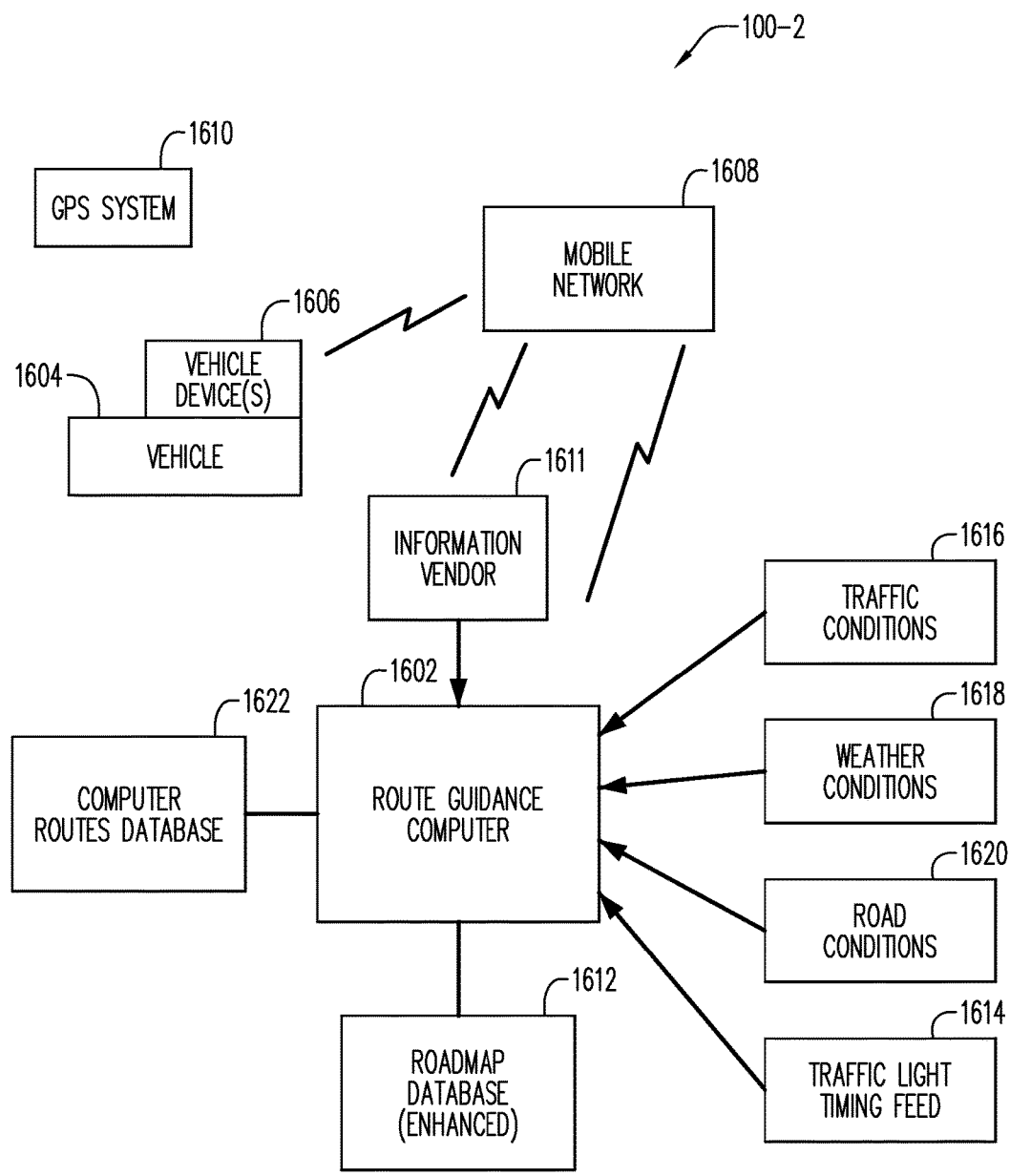
FIG. 16 is a block diagram representation of still another embodiment of the system of FIG. 1.

FIG. 16 is a block diagram representation of a system 100-2 that is another example embodiment of the system 100 of FIG. 1. System 100-2 is provided in accordance with aspects of the present invention.

The system 100-2 includes a route guidance computer 1602 provided according to aspects of the present invention. The route guidance computer 1602 may, for example, be operated by an insurance company to aid its customers in making their motor vehicle commuting more efficient and/or safer. In other embodiments, the route guidance computer 1602 may be operated by an entity other than an insurance company. In some embodiments, the route guidance computer 1602 may be part of a publicly and/or privately operated effort to use information management technology to provide a "smart" highway system or the like. Details of embodiments of the route guidance computer 1602 will be provided below in conjunction with FIGS. 17, 19 and 20.

Also shown as part of the system 100-2 is a motor vehicle 1604. Although only one vehicle 1604 is shown in the drawing, a practical embodiment of the system may involve numerous vehicles that are simultaneously tracked and guided by the route guidance computer 1602. Also shown in FIG. 16 is a vehicle device 1606 that is installed in the vehicle 1604 to provide information to the driver of the vehicle 1604 and/or to the route guidance computer 1602 in accordance with aspects of the present invention. As will be seen, the vehicle device 1606 may serve as a portion of a communication path from the route guidance computer 1602 to the driver (not shown) of the vehicle 1604. Details of the vehicle device 1606 will be provided below in connection with FIGS. 18, 21 and 22. The vehicle device 1606 may communicate with the route guidance computer 1602 via a conventional mobile communication network (reference numeral 1608). Just as numerous vehicles may be included in a practical embodiment of the system 100-2, it is also the case that numerous respective vehicle devices may be part of the system 100-2. As discussed below, the vehicle device 1606 may include capabilities to receive and analyze signals from the well-known satellite-based Global Positioning System (GPS), which is represented by block 1610 in the drawing.

Telematics information generated by the vehicle device 1606 may be collected by an information vendor 1611 via the mobile network 1608. The information vendor 1611 may serve as a source of telematics information to the route guidance computer 1602.

One important purpose of the system 100-2 is for the route guidance computer 1602 to provide useful real-time information and guidance to the driver of the vehicle 1604 while he/she is engaged in commuting. To support this purpose, the route guidance computer 1602 may store, receive and/or synthesize various types of information. For example a roadmap database 1612 may be associated with the route guidance computer 1602. In many ways the data available to the route guidance computer 1602 from the roadmap database 1612 may be similar to the data that underlies services such as Google Maps or Mapquest. However, in addition to electronic roadmap data, the roadmap database 1612 may also include information that identifies and locates traffic control devices such as traffic signals, stop signs and yield signs. In particular, the roadmap database 1612 may include the exact locations by intersection and facing directions of traffic signals, as well as unique identifiers for the traffic signals.

In addition to the (substantially static) roadmap and traffic signal data from the database 1612, the route guidance computer 1602 may also depend on a dynamic, substantially real-time feed of traffic light statuses (this feed is represented by block 1614). This feed of real-time traffic light status information may, for example, come from one or more central computer systems (not shown) that may control and/or monitor the sequence and timing of traffic signals in one or more metropolitan areas. In addition or alternatively, the data feed 1614 may at least in part come from traffic signals themselves (not shown) that self-report current and future status via suitable communication channels (not shown) such as fixed data communication lines and/or one or more mobile communication networks.

It may be desirable that the information in the traffic signal data feed contain one or more of the following types of information: (a) unique signal/intersection identifier; (b) current state; (c) travel direction and/or travel/turn lanes controlled by the signal; (d) next scheduled state (or a sequence of scheduled states); and (e) the scheduled timing of the next scheduled state transition or each transition of a scheduled sequence of transitions. It may also be desirable for the sources of the traffic signal data and the route guidance computer 1602 to work from a common time clock that has a granularity of, say, tenths of a second.

Block 1616 in FIG. 16 represents a feed of real-time traffic conditions data to the route guidance computer 1602. The traffic conditions data feed 1616 may originate from one or more remote computers (not separately shown) that monitor traffic conditions on roadways. This may be done, for example, by analyzing images fed to the remote computers from traffic cameras and/or on the basis of information from other types of sensors. In some embodiments the traffic cameras may be adjacent the roadways or in low orbit satellites or both. Alternatively, in some embodiments, the route guidance computer 1602 may itself directly receive and monitor traffic camera/sensor input to detect traffic conditions.

Also shown in FIG. 16 is a block 1618 that represents a weather conditions data feed provided to the route guidance computer 1602. It may be desirable that the weather condition data be substantially real-time and have a high degree of spatial granularity.

In addition, the route guidance computer 1602 may also receive a road conditions data feed (block 1620). In some embodiments, the road conditions data feed 1620 may be provided to the route guidance computer 1602 from one or more remote computers that monitor road conditions via sensors. It may be desirable that the sensors be densely installed on at least all major roadways and through routes in the areas for which the route guidance computer 1602 provides guidance. The data provided by the sensors may indicate road conditions such as ice, snow, wet roadway, flooding, dry conditions, etc. It may be desirable that the road conditions data be received in substantially real-time at the route guidance computer 1602. The data may indicate the sensor location along with the current road condition detected by the respective sensor.

Still further, there may be a commuter routes database 1622 associated with the route guidance computer 1602. The commuter routes database 1622 may store commuting routes that have been uploaded to the route guidance computer 1602 by or on behalf of individual drivers who have elected to receive real-time driving guidance from the route guidance computer 1602. In some embodiments the drivers may manually enter their habitual commuting routes to the route guidance computer 1602. (This may occur, for example, via personal computers, etc.—which are not shown in FIG. 16—via access to a website maintained by the route guidance computer 1602.) In addition or alternatively, in at least some cases, the drivers' habitual commuting routes may have been detected automatically via data uploaded from the vehicle device 1606 to the route guidance computer 1602 while the commuting activity is taking place.

Figure 17:
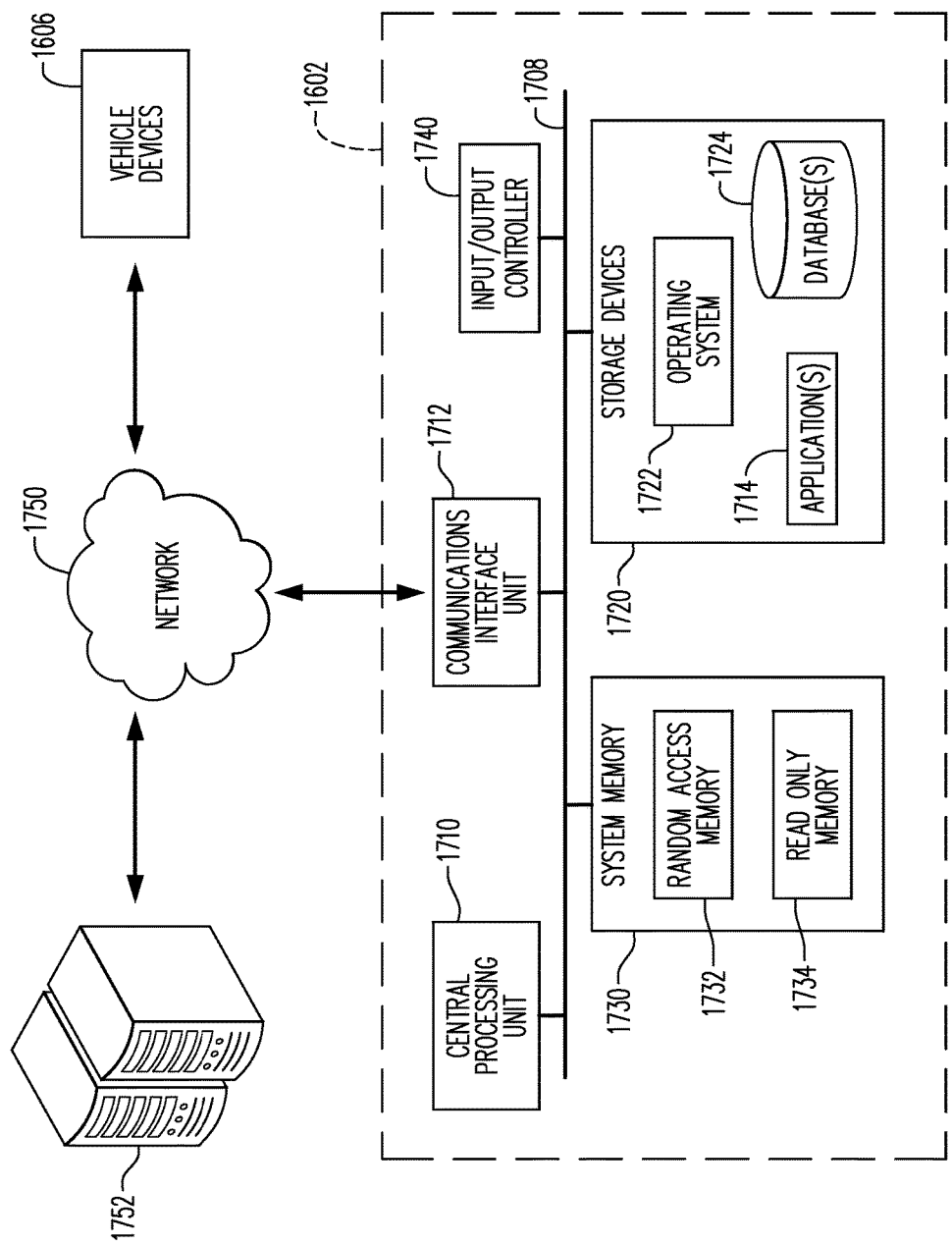
FIG. 17 is a block diagram representation of a computer that implements a portion of the embodiment of FIG. 16.

FIG. 17 is a block diagram representation of the route guidance computer 1602, together with other components of the system 100-2.

In the route guidance computer 1602, a central processing unit or processor 1710 executes instructions contained in programs, including for example application software programs 1714, stored in storage devices 1720. The application software programs 1714 may provide functionality as described herein to implement the route guidance computer 1602 and/or functionality of the route guidance computer 1602 as described herein. Processor 1710 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 1720 may include suitable media, such as optical or magnetic disks, fixed disks with magnetic storage (hard drives), tapes accessed by tape drives, and other storage media. Processor 1710 communicates, such as through bus 1708 and/or other data channels, with communications interface unit 1712, storage devices 1720, system memory 1730, and input/output controller 1740. System memory 1730 may further include non-transitory computer-readable media such as a random access memory 1732 and a read only memory 1734. Random access memory 1732 may store instructions in the form of computer code provided by an application 1714 to implement teachings of the present invention. The route guidance computer 1602 further includes an input/output controller 1740 that may communicate with processor 1710 to receive data from user inputs such as pointing devices, touch screens, and audio inputs, and may provide data to outputs, such as data to video drivers for formatting on displays, and data to audio devices.

Continuing to refer to FIG. 17, storage devices 1720 are configured to exchange data with processor 1710, and may store programs containing processor-executable instructions, and values of variables for use by such programs. Processor 1710 is configured to access data from storage devices 1720, which may include connecting to storage devices 1720 to obtain or read data from the storage devices, or place or store data into the storage devices. Storage devices 1720 may include local and network accessible mass storage devices. Storage devices 1720 may include media for storing operating system 1722 and mass storage devices such as storage 1724 for storing one or more databases, including for example the databases 1612 and 1622 discussed above in connection with FIG. 16.

Continuing to refer to FIG. 17, communications interface unit 1712 may communicate via a network 1750 with other computer systems or devices, such as vehicle devices and one or more remote computers 1752, which may be the sources of the data feeds 1614-1620 as discussed above in connection with FIG. 16.

Continuing to refer to FIG. 17, the communications interface unit 1712 may communicate with other servers and/or computer systems that function as remote sources of data. The route guidance computer 1602 may also be configured in a distributed architecture, wherein databases and processors are housed in separate units or locations. Some such servers may perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. The network 1750 may be or include wired or wireless local area networks and wide area networks and/or mobile communication networks, and may be implemented at least in part via communications between networks, including over the Internet.

One or more public cloud, private cloud, hybrid cloud and cloud-like networks may also be implemented, for example, to handle and conduct processing of one or more tasks, transactions, operations or processes as described herein as aspects of the present invention. Cloud based computing may be used herein to handle any one or more of the application, storage and connectivity requirements of the route guidance computer 1602 and aspects of the present invention. For example, one or more private clouds may be implemented to handle web hosting, and data processing and storage in accordance with aspects of the present invention. Furthermore, any suitable data and communication protocols may be employed to accomplish the teachings of the present invention.

With reference still to FIG. 17, communications interface 1712 is used for receiving and transmitting data related to the function of the route guidance computer 1602 in regard to providing driving guidance. Processor 1710 executes program instructions, such as program instructions provided by application(s) 1714 to receive (via the communications interface 1712) and to store (in database storage 1724) the data relating to the driving guidance functionality.

Figure 18:
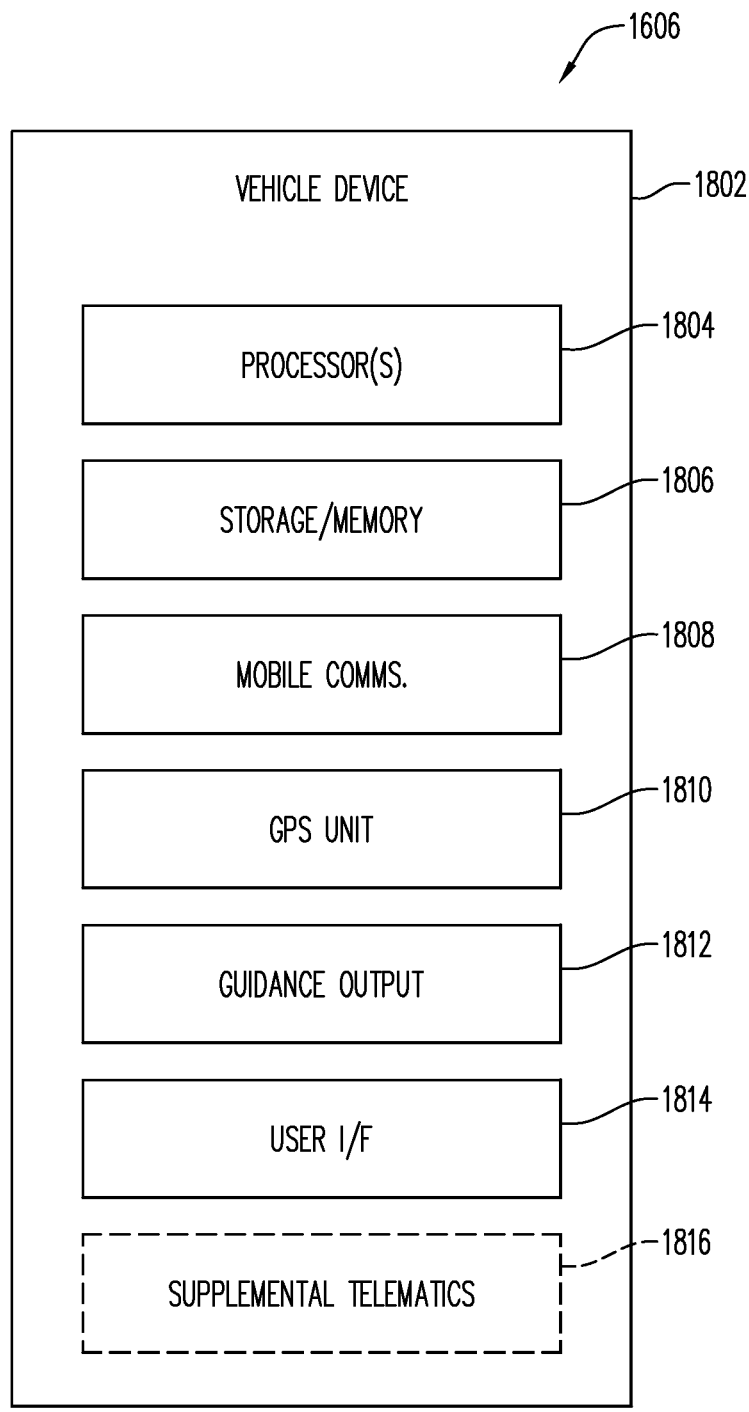
FIG. 18 is a block diagram representation of a typical vehicle device that may be installed in motor vehicles in connection with the embodiment of FIG. 16.

FIG. 18 is a block diagram representation of a typical embodiment of a vehicle device 1606 such as that shown in FIG. 16. In some embodiments, vehicle device 1606 is implemented as a single device that performs all of the functions described below. However, in other embodiments, this functionality is divided between two or more devices that may be present in the vehicle 1604 (FIG. 16) and that are or may be in communication with each other. For example, the vehicle device or devices, as the case may be, may incorporate functions commonly found in conventional GPS navigation devices and in conventional telematics devices. A description of some examples of telematics devices is contained in U.S. Pat. No. 8,359,259, issued to Berg et al., and commonly assigned herewith.

The vehicle device 1606 includes a housing schematically indicated at 1802 in FIG. 18. As noted above, the functionality of the vehicle device 1606 may be divided among two or more devices, in which case the devices may each include a separate device housing.

The vehicle device 1606 may include one or more processors 1804 contained within the housing 1802. The vehicle device 1606 may also include one or more memory/storage devices 1806, which are in communication with the processor(s) 1804 and which are contained within the housing 1802. The memory/storage devices 1806 may store software to control the processor(s) 1806 such that the vehicle device 1606 provides functionality as described herein.

The vehicle device 1606 also may include the following further components, which may be contained within and/or supported on the housing 1802: (a) a mobile communications unit 1808; (b) a GPS unit 1810; (c) a driver guidance component 1812; (d) a user interface 1814; and (e) optionally, one or more supplemental telematics components 1816. Some or all of the components 1808, 1810, 1812, 1814 and 1816 may be in communication with the processor(s) 1804.

The mobile communications unit 1808 may handle communications via the mobile network 1608 to and from the route guidance computer 1602.

The GPS unit 1810 may receive GPS signals to continually detect and update the location of the vehicle 1604. In cooperation with the processor(s) 1804, the GPS unit 1810 may supply data indicative of the current velocity and direction of travel of the vehicle 1604, in addition to data that indicates the current location of the vehicle 1604. In other embodiments, the vehicle device 1606 does not determine velocity and direction of travel by the vehicle 1604. Rather, with real-time updates of the vehicle location provided from the vehicle device 1606 to the route guidance computer 1602, the route guidance computer 1602 may calculate/derive the velocity and direction of travel of the vehicle 1604 from the vehicle location data it receives from the vehicle device 1606. In some embodiments, the supplemental telematics components 1816 may include a direction sensing capability to provide data indicative of the direction the vehicle 1604 is facing. The supplemental telematics components 1816 may also detect the vehicle velocity directly from data provided by the vehicle 1606 itself. In either or both cases this information may be used by the vehicle device 1606 and/or the route guidance computer 1602 to aid in determining current velocity and direction of travel by the vehicle 1604.

As will be described below in connection with FIGS. 19-22, the guidance output component 1812 may respond to signals received by the vehicle device 1802 from the route guidance computer 1602 by providing audible and/or visible guidance information to the driver of the vehicle 1604 while the driver is traveling his/her commuting route. The guidance output component 1812 may, in some embodiments, overlap with the user interface 1814 of the vehicle device 1606. In some embodiments, the user interface 1814 may resemble the user interface of a conventional GPS navigation device.

In addition to providing telematics data such as vehicle location, velocity and/or direction of travel, the vehicle device 1606 may have additional telematics capabilities, represented by block 1816, including some that have been described above. Such capabilities may also include detecting vehicle acceleration, deceleration, braking, steering maneuvers, wheel skidding conditions, etc.

Figure 19:
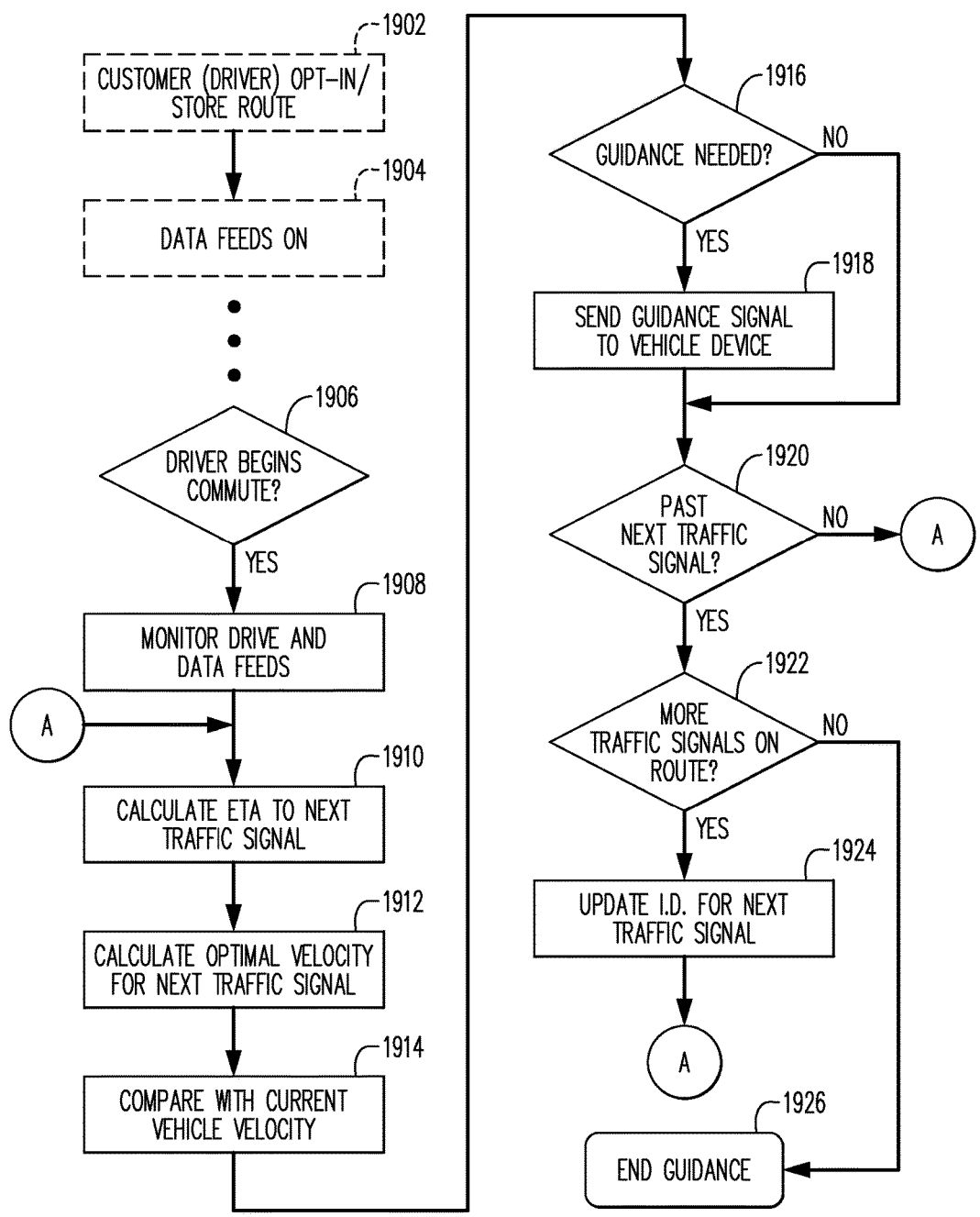
FIGS. 19 and 20 are flow charts that illustrate example processes that may be performed in the computer of FIG. 17 in accordance with aspects of the invention.

FIG. 19 is a flow chart that illustrates an example process that may be performed in the route guidance computer 1602 in accordance with aspects of the invention.

In a preliminary step, represented by block 1902 in FIG. 19, the insurance company customer/driver may opt-in to receive commuting/driving guidance from the route guidance computer 1602. In connection with the opt-in—and/or on an automated basis relying on telematics data from the vehicle device 1606—the driver's habitual commuting route is stored on a turn-by-turn basis in the database 1622 (FIG. 16) associated with the route guidance computer 1602. In some embodiments, the customer/driver may receive an incentive such as an insurance policy premium discount to induce the customer to opt in for route guidance. At the same time or alternatively, the customer may opt in for the purpose of being guided to greater fuel economy while commuting.

As a further set of conditions preliminary to the balance of the process flow, and as represented at block 1904 in FIG. 19, it is assumed that the data feeds 1614, 1616, 1618 and 1620—described above with reference to FIG. 16—are continuously being received by the route guidance computer 1602. To briefly recapitulate, the data feeds relate to traffic signals (current states and timing of future transitions), traffic conditions, weather conditions, and road conditions.

Continuing to refer to FIG. 19, at decision block 1906, the route guidance computer 1602 determines whether the customer/driver is beginning to drive his/her commuting route. There are a number of mechanisms by which the route guidance computer 1602 may be enabled to make this determination. For example, in some embodiments, the driver may expressly signal via the user interface 1814 of the vehicle device 1606 that he/she is commencing the drive to work or home, and in effect is requesting that monitoring and guidance for the driver by the route guidance computer 1602 should begin. Alternatively, the route guidance computer 1602 may monitor telematics output from the vehicle device 1606, and based on that output, plus the current time of day, the route guidance computer 1602 may determine with a greater or lesser degree of certainty that the customer/driver is commencing his/her commute.

If the route guidance computer 1602 makes a positive determination at decision block 1906 (i.e., if the route guidance computer 1602 determines that the driver has begun his/her commute), then block 1908 may follow decision block 1906 in the process flow. At decision block 1908, the route guidance computer 1602 monitors and continues to monitor both the data coming in from the above-mentioned data feeds, 1614 through 1620, while also monitoring and continuing to monitor the location, velocity and direction of travel of the vehicle 1604.

Block 1910 may follow block 1908 in the process flow of FIG. 19. Based on the stored commuting route for the vehicle 1604, the enhanced map data in database 1612, and the current location and direction of travel of the vehicle 1604 (as reported by the vehicle device 1606), the route guidance computer 1602 is able to determine in real-time the location of the next traffic signal that the vehicle 1604 will encounter as it proceeds on its commuting route. At block 1910, the route guidance computer 1602 may compute the estimated time of arrival of the vehicle 1604 at the next traffic signal. This computation may take into account the current velocity of the vehicle 1604 as well as traffic conditions reported from the traffic conditions data feed 1616 (FIG. 16).

Block 1912 may follow block 1910 in the process flow. At block 1912, the route guidance computer 1602 may calculate an optimal current velocity for the vehicle to maximize the likelihood that the next traffic signal will be "green" when the vehicle 1604 reaches it. In calculating the optimal velocity, the route guidance computer 1602 may consider the current state of the traffic signal, its expected future states and the timings thereof as reported in the traffic light timing feed 1614 (FIG. 16), and the vehicle's current location and traffic conditions as reported by the data feed 1616. In determining the optimal velocity, the route guidance computer 1602 may also consider the current weather, road and traffic conditions for the current and near-future locations of the vehicle 1604. While fuel economy is an objective in determining the current optimal velocity for the vehicle, safety is an overriding concern, as the route guidance computer 1602 will not generate an optimal velocity that is unsafe for the current conditions. Moreover, in some embodiments, the route guidance computer 1602 also will not generate an optimal velocity that is in excess of the applicable speed limit for the current road location of the vehicle 1604.

In many cases, the optimal velocity may be slower than the current velocity of the vehicle 1604, as the current velocity may cause the vehicle 1604 to arrive at the traffic signal at a time when the signal is "red", whereas a lower velocity may cause the vehicle to arrive at the traffic signal at a time when the signal is "green". Thus, the lower, optimal velocity in such a case may reduce fuel consumption by avoiding braking to a stop and then accelerating when the signal turns green. A lower current velocity may also reduce the current rate of fuel usage by the vehicle. Still further, the optimal velocity may promote safety and reduced risk in addition to promoting fuel economy. For example, the optimal velocity may be such that it reduces the possibility that the driver may need to engage in hard braking in response to a change in signal status from a green condition as the vehicle approaches the intersection. Thus this process may be advantageous to the insurance company by tending to reduce the likelihood of loss events.

Block 1914 may follow block 1912 in the process of FIG. 19. At block 1914, the route guidance computer 1602 may compare the optimal velocity calculated at 1912 with the vehicle's current velocity. Then, at decision block 1916, the route guidance computer 1602 may determine whether guidance to the driver is in order. That is, if the optimal velocity of the vehicle does not match the current velocity of the vehicle, the route guidance computer 1602 may make a positive determination at decision block 1916, i.e., a determination that the route guidance computer 1602 should issue guidance to the driver to decelerate or accelerate the vehicle.

If the route guidance computer 1602 makes a positive determination at decision block 1916, then block 1918 follows decision block 1916 in the process flow. At block 1918, the route guidance computer 1602 may send a guidance signal to the vehicle device 1606 to prompt the vehicle device 1606 to provide an audible and/or visible signal to the driver to suggest that he/she decelerate or accelerate the vehicle so that its velocity converges to the optimal velocity as calculated by the route guidance computer 1602. This is typically done within a short time, say less than one second, after the route guidance computer performs steps 1914 and 1916.

Decision block 1920 is also in the process flow. If the route guidance computer 1602 makes a negative determination at decision block 1916 (i.e., if the route guidance computer 1602 determines that no guidance is currently in order for the driver), then decision block 1920 directly follows decision block 1916, and block 1918 is skipped. Otherwise, decision block 1920 follows block 1918.

At decision block 1920, the route guidance computer 1602 determines whether the vehicle has passed (or is stopped at) the next traffic signal that was under consideration at block 1910, etc. If not, then the process loops back from decision block 1920 to block 1910. However, if the route guidance computer 1602 makes a positive determination at decision block 1920 (i.e., the "next" traffic signal considered at 1910 is no longer an issue), then the process may advance from decision block 1920 to decision block 1922. At decision block 1922, the route guidance computer 1602 determines whether there are further traffic signals ahead on the driver's commuting route. This determination may be made based on the vehicle's current location and based on the enhanced road map data available from the database 1612 (FIG. 16). Continuing to refer to FIG. 19, if the route guidance computer 1602 makes a positive determination at decision block 1922 (i.e., the vehicle is due to encounter at least one more traffic signal), then the process flow may advance from decision block 1922 to block 1924. At block 1924, the route guidance computer 1602 uses the current vehicle location and the enhanced mapping data (database 1612) to determine the unique identifier for the next traffic signal on the commuting route. Then the process may loop back from block 1924 to block 1910, etc.; at the next iteration of block 1910, the route guidance computer 1602 will take into consideration the current state and future timing of the traffic signal identified at 1924.

Considering again decision block 1922, if the route guidance computer 1602 makes a negative determination at that decision block (i.e., there are no more traffic signals ahead on the commuting route), then the process flow may advance from decision block 1922 to terminal block 1926. At terminal block 1926, the route guidance computer 1602 may cease its monitoring and guidance activities with respect to the vehicle's current commuting trip.

In some embodiments, the process of FIG. 19 may be modified in a number of ways. For example, if the next traffic signal is quite distant and/or there is heavy traffic between the vehicle's current location and the next traffic signal, the route guidance computer 1602 may determine that the conditions are such that guidance to driver would not be useful and therefore is not warranted. At such times, the route guidance computer 1602 may omit steps 1912 through 1918. Rather, the route guidance computer 1602 may continue to monitor the vehicle's location, velocity, etc. until either conditions are conducive to useful guidance operations or the vehicle has passed the last traffic signal on the route.

In the above description of the process of FIG. 19, the route guidance computer 1602 sends guidance signals to a vehicle device installed in a vehicle that the route guidance computer 1602 is tracking. In addition or alternatively, the route guidance computer 1602 may post one or more guidance signals and/or guidance information on a website that is accessible by one or more vehicle devices and/or one or more other devices operated by insurance company customers.

Figure 20:
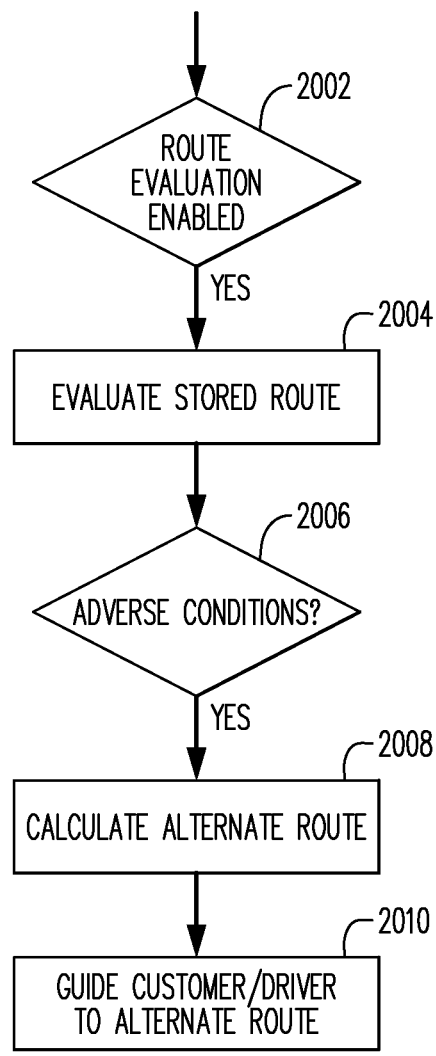

FIG. 20 is a flow chart that illustrates another example process that may be performed in the route guidance computer 1602 in accordance with aspects of the invention. The process of FIG. 20 may run in parallel with and/or cooperatively with the process of FIG. 19. While the process of FIG. 19 is concerned with recommending velocity changes to the driver, the process of FIG. 20 is concerned with potentially recommending to the driver that he/she alter the normal commuting route in the face of adverse conditions.

The process of FIG. 20 may begin with a decision block 2002, at which the route guidance computer 1602 may determine whether route evaluation and guidance processing have been enabled for a particular driver/customer. Enabling of route evaluation/guidance may occur, for example, if the driver opts in, either on an advance basis in general, or specifically while commencing a commuting trip on a particular day. Enabling of route evaluation/guidance may also require that the driver has commenced a commuting trip.

If the route guidance computer 1602 makes a positive determination at decision block 2002, then block 2004 may follows decision block 2002. At block 2004, the route guidance computer 1602 may evaluate the weather, road and/or traffic conditions that currently affect the driver's stored commuting route to determine whether one or more of those conditions are such that the customary commuting route is likely under the current conditions to take significantly longer to travel than the normal travel time. Such a situation may be referred to as "adverse conditions" for the stored commuting route. Examples of adverse conditions may include road flooding, a significant accumulation of unplowed snow or a traffic jam that is significant and uncommon for the commuting route.

(In order to aid in determining whether adverse traffic conditions are in effect at a particular time for the driver's commuting route, the route guidance computer 1602 may engage in an ongoing traffic learning process. According to the traffic learning process, the route guidance computer 1602 may regularly monitor the traffic conditions that each driver encounters while commuting and may draw conclusions about what normal traffic conditions are—during commuting hours—for each stored commuting route. The route guidance computer 1602 may store data indicative of its conclusions about normal traffic conditions in association with each of the stored commuting routes.)

Decision block 2006 may follow block 2004. At decision block 2006, the route guidance computer 1602 may determine whether the route evaluation that occurred at block 2004 indicated that adverse conditions exist for the stored commuting route. If so, then block 2008 may follow decision block 2006. At block 2008, the route guidance computer 1602 may calculate an alternative route for the driver to his home or work location, as the case may be. In some embodiments, this process stage may involve techniques typically employed in conventional GPS navigation devices. However, the route guidance computer 1602 may additionally consider whether one or more of weather, road and traffic conditions may currently cause the potential alternate route not to offer a significant advantage relative to the normal route.

Assuming that the route guidance computer 1602 is able to determine an advantageous alternate route, then block 2010 may follow block 2008. At block 2010, the route guidance computer 1602 may send a sequence of signals to the vehicle device 1606, such that the vehicle device 1606 is prompted to provide guidance to the driver to suggest that the driver follow the alternate route determined by the route guidance computer 1602. This guidance may, in some embodiments, take the form of turn-by-turn instructions of the type provided by conventional GPS navigation devices.

Figure 21:
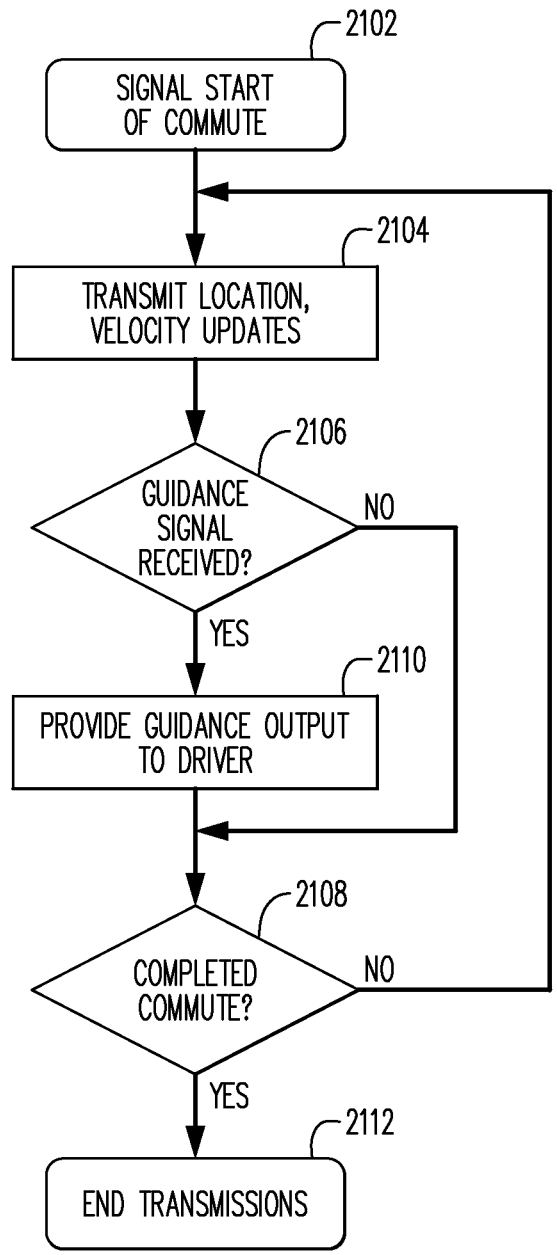
FIG. 21 is a flow chart that illustrates an example process that may be performed in the vehicle device of FIG. 18 in accordance with aspects of the invention.

FIG. 21 is a flow chart that illustrates an example process that may be performed in the vehicle device 1606 in accordance with aspects of the invention. In a sense, the process of FIG. 21 may be considered the cooperation or participation by the vehicle device 1606 in the process(es) of FIG. 19 and/or FIG. 20.

At block 2102 in FIG. 21, the vehicle device 1606 may signal to the route guidance computer 1602 that the vehicle 1604 is commencing a commuting trip. As noted above, this may be an explicit signal that indicates commuting trip commencement or alternatively may be conventional telematics signaling regarding vehicle location and/or travel that by its nature and timing indicates to the route guidance computer 1602 that it is in order to infer that the vehicle is beginning a commuting trip.

At block 2104, the vehicle device 1606 may transmit frequent updates concerning the vehicle's location and possibly also velocity and direction of travel. In some embodiments, this may occur in accordance with conventional techniques for telematics transmissions from a moving vehicle.

A decision block 2106 may follow block 2104. At decision block 2106, the vehicle device 1606 may determine whether it has received a guidance signal from the route guidance computer 1602. For example, such a signal may be of the kind described above in connection with block 1918 in FIG. 19 and/or block 2010 in FIG. 20. In the absence of such a guidance signal, the process may branch from decision block 2106 to decision block 2108. At decision block 2108, the vehicle device 1606 may determine whether the commuting trip has been completed. If not, the process may loop back from decision block 2108 to block 2104.

Considering again decision block 2106, if the vehicle device 1606 makes a positive determination at that decision block (i.e., if a guidance signal is received from the route guidance computer 1602), then the process flow may advance from decision block 2106 to block 2110. At block 2110, the vehicle device 1606 may comply with the guidance signal by providing an audible and/or visible signal to the driver to convey the guidance provided by the route guidance computer 1602. For example, if the user interface 1814/guidance output component 1812 (FIG. 12) of the vehicle device 1606 includes a loudspeaker, then the vehicle device 1606 may audibly reproduce statements such as "Reduce speed to 25 miles per hour", or the like. In some embodiments, the vehicle device 1606 may include a flashing light or indicator to indicate to the driver that this audible guidance is coming from the traffic light optimization service for which the driver had previously opted in. As an alternative or supplement to providing audible and/or visible guidance, the vehicle device 1606 may be operative to provide guidance by a vibrational signal or the like, by—for example—causing the steering wheel to vibrate.

Other types of guidance signals for the driver from the vehicle device 1606 may be visual, such as a numeric display indicating the optimal velocity calculated by the route guidance computer 1602; or a color coded display to indicate guidance to accelerate, decelerate or maintain current speed; or a display of arrows that point up or down to indicate guidance to accelerate or decelerate.

Guidance relating to a suggested change in the commuting route (pursuant to block 2010, FIG. 20) may be provided in accordance with conventional techniques for turn-by-turn directions from a GPS navigation device, for example.

From block 2110, the process flow advances to decision block 2108, which was referred to above. Considering again decision block 2108, if a positive determination is made at that decision block (i.e., if the vehicle device 1606 determines that the commuting trip has been completed), then the process advances from decision block 2108 to terminal block 2112. At terminal block 2112, the vehicle device 1606 may cease making the data transmissions referred to above in connection with block 2104.

Figure 22:
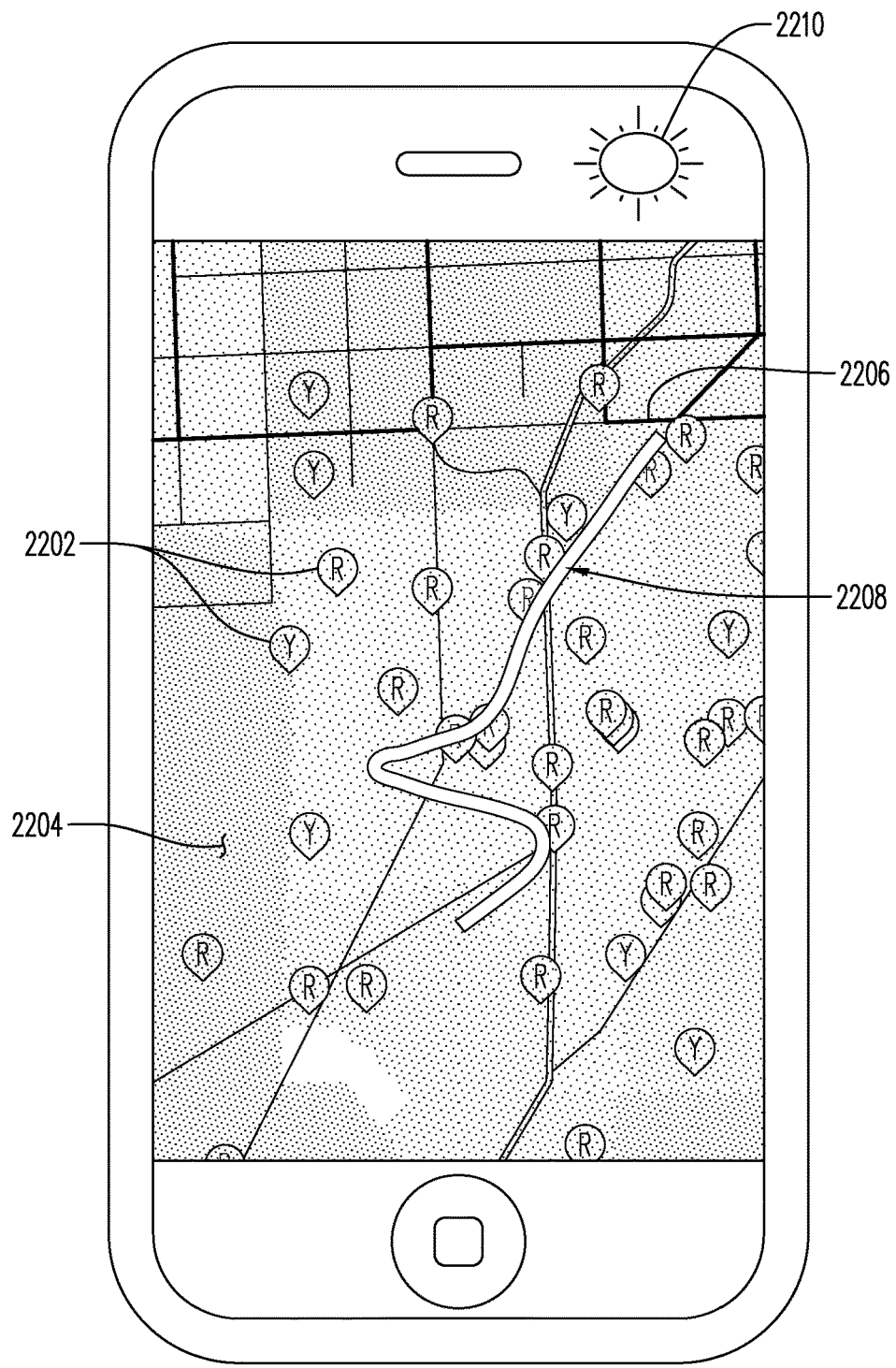
FIG. 22 shows an example screen shot of a display that may be provided to the customer/driver by the vehicle device of FIG. 18 in accordance with aspects of the invention.

FIG. 22 shows an example display that may be provided to the customer/driver by the vehicle device 1606 in accordance with aspects of the invention.

In FIG. 22, reference numeral 2202 indicates display features that may be presented in color to indicate the real-time states of traffic signals in the direction that the vehicle 1604 will be taking. Though not shown, a countdown display may accompany the traffic signal state indications in some embodiments.

At 2204, heavily built-up areas are indicated, to alert the driver that there may be a likelihood of running into dense traffic in these locations.

At 2206, mapped roads may be displayed with color coding to indicate that the roads in question may be dangerous and/or slow.

Reference numeral 2208 indicates an optimal route calculated by the route guidance computer 1602. The route 2208 may be optimal in terms of one or more of safety, travel time and minimization of variations in speed.

Reference numeral 2210 points to a flashing indicator that may be actuated when the vehicle device 1606 is receiving guidance signals from the route guidance computer 1602.

In some embodiments, due to the potential safety features of the route guidance computer 1602, drivers/customers who opt in to receive the guidance may qualify for insurance policy premium discounts. In some embodiments, the vehicle device 1606 and the route guidance computer 1602 may cooperate to detect to what extent the customer complies with the guidance provided, and on this basis the customer's qualification for the discount may be confirmed. The amount of the discount may be greater for customers with longer and/or riskier commutes.

In the above discussion of the embodiment of FIG. 16, there has been an implicit assumption that there is a one-to-one relationship between vehicles/vehicle devices and commuting routes. However, in some cases a household may include more than one commuting driver, and use of a given vehicle may be shared between two commuting drivers who have different commuting routes from each other. Thus, in a set-up mode of the embodiment of FIG. 16, the driver or drivers of a vehicle may cause two or more commuting routes to be stored in the route guidance computer 1602 for a given vehicle/vehicle device. Each of the stored commuting routes may be associated with the identity of one of the drivers in the household. Upon starting a commute, the driver may provide input to the route guidance computer 1602 via the vehicle device 1606 to identify the driver, so that the route guidance computer 1602 knows which stored commuting route is applicable to the current situation. In addition or alternatively, the route guidance computer 1602 may make an inference as to which stored commuting route is applicable based on the travels of the vehicle 1604 (as reported by the vehicle device 1606) at the beginning of the particular day's commute.

Embodiments described above involving the route guidance computer 1602 have included providing guidance indications to a human driver. However, in alternative embodiments, the vehicle 1604 may be of the self-driving type, and guidance signals may be provided from the route guidance computer 1602 to a computer (not shown) that controls the vehicle 1604 (or the vehicle device 1606 may be arranged to control the vehicle 1604).

The awareness by the route guidance computer of the states of traffic signals and the location and velocity of vehicles may have applications in addition to route and/or velocity guidance. For example, the combination of information referred to in the previous sentence may be used to enhance advertising opportunities. In some embodiments, the route guidance computer may know or be able to predict when the vehicle may be stopped at a traffic signal. The route guidance computer may use this knowledge to cue an advertiser to serve a commercial to the driver at a time when the vehicle is stopped (so that presumably the driver would then be more attentive to the commercial than when the vehicle is in motion). For example, the commercial may be served via an internet radio station or phone app that the driver is listening to.

The process descriptions and flow charts contained herein should not be considered to imply a fixed order for performing process steps. Rather, process steps may be performed in any order that is practicable.

As used herein and in the appended claims, the term "proximately in time" means within an interval of ten seconds or less.

As used herein and in the appended claims, the term "severity" refers to a measure of cost of an insurance claim to an insurance company or to a level of intensity of a weather event.

As used herein and in the appended claims, the term "computer" refers to a single computer or to two or more computers in communication with each other and/or operated by a single entity or by two or more entities that are partly or entirely under common ownership and/or control.

As used herein and in the appended claims, the term "processor" refers to one processor or two or more processors that are in communication with each other.

As used herein and in the appended claims, the term "memory" refers to one, two or more memory and/or data storage devices.

As used herein and in the appended claims, an "entity" refers to a single company or two or more companies that are partly or entirely under common ownership and/or control.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computerized method comprising:
rendering, on a display on a user computing device, a user interface for receiving commute data from the user including commute endpoints defining a starting point and an ending point of the commute and commute temporal data corresponding to a commute;
storing, in a computer data storage device by a computer processor coupled to the computer data storage device, the commute data received, via a communication interface unit coupled to the computer processor, from the user interface;
performing, by the computer processor, a route-based computerized analysis of the commuting data for the commute, said performing including:
  determining a trajectory from the starting point of the commute to the ending point of the commute based on traffic density data;
  calculating, based on a length of the trajectory from the starting point of the commute to the ending point of the commute, a width corresponding to the trajectory of the commute from the starting point of the commute to the ending point of the commute;
  defining, based on the trajectory of the commute from the starting point of the commute to the ending point of the commute and the calculated width, a commuting region between the endpoints of the commute; and
  analyzing incident experience data relevant to the defined region; and
transmitting, by the communication interface unit to the user computing device, a suggested driving route based on a result of the route-based computerized analysis, said transmitting occurring proximately in time with performance of said route-based analysis.

2. The method of claim 1, further comprising transmitting, by the communication interface unit to the user computing device, a premium for a proposed automobile insurance policy for which the user is seeking a quotation at an e-commerce website.

3. The method of claim 1, further comprising transmitting, by the communication interface unit to the user computing device, real-time information that reflects a policy rate adjustment based on a commute risk factor $RF_C$, the commute risk factor $RF_C$ calculated as:

$$RF_C = (N_{IC} \times S_{IC}) + (N_{IZ} \times S_{IZ});$$

where: $N_{IC}$=number of incidents in said defined region;
$S_{IC}$=average severity of incidents in said defined region;
$N_{IZ}$=number of incidents in a zip code in which the user resides; and
$S_{IZ}$=average severity of incidents in the zip code in which the user resides.

4. The method of claim 1, wherein the route-based computerized analysis is based at least in part on historical claim data.

5. The method of claim 1, wherein the suggested driving route is transmitted to the user computing device while the user is driving.

6. The method of claim 1, wherein the route-based computerized analysis includes analysis of respective states of traffic signals along the suggested driving routes.

7. The method of claim 6, further comprising transmitting, by the communication interface unit to the user computing device, information indicative of a suggested acceleration or deceleration of the user's vehicle.

8. A system comprising:
one or more storage devices storing commute data corresponding to a plurality of users;
a server communicatively coupled to the one or more storage devices comprising:
a communications interface unit configured to communicate with a plurality of user computing devices;
one or more computer processors configured to:
render, on a display on a user computing device, a user interface for receiving commute data from the user including commute endpoints defining a starting point and an ending point of the commute and commute temporal data corresponding to a commute;
perform a route-based computerized analysis of the commuting data for the commute to:
determine a trajectory from the starting point of the commute to the ending point of the commute based on traffic density data;
calculate, based on a length of the trajectory from the starting point of the commute to the ending point of the commute, a width corresponding to the trajectory of the commute from the starting point of the commute to the ending point of the commute;
define, based on the trajectory from the starting point of the commute to the ending point of the commute and the calculated width, a commuting region between the endpoints of the commute; and
analyze incident experience data relevant to the defined region; and
transmit, by the communications interface unit to the user computing device, a suggested driving route based on a result of the route-based computerized analysis, said transmitting information occurring proximately in time with performance of said route-based analysis.

9. The system of claim 8, wherein the one or more computer processors are further configured to transmit, by the communication interface unit to the user computing device, a premium for a proposed automobile insurance policy for which the user is seeking a quotation at an e-commerce website.

10. The system of claim 8, wherein the one or more computer processors are further configured to transmit, by the communication interface unit to the user computing device, real-time information that reflects a policy rate adjustment based on a commute risk factor $RF_C$, the commute risk factor $RF$ calculated as:

$$RF_C = (N_{IC} \times S_{IC}) + (N_{IZ} \times S_{IZ});$$

where: $N_{IC}$=number of incidents in said defined region;
$S_{IC}$=average severity of incidents in said defined region;
$N_{IX}$=number of incidents in a zip code in which the user resides; and
$S_{IZ}$=average severity of incidents in the zip code in which the user resides.

11. The system of claim 8, wherein the route-based computerized analysis is based at least in part on historical claim data.

12. The system of claim 8, wherein the one or more computer processors transmits the suggested driving route for the user, while the user is driving.

13. The system of claim 8, wherein the route-based computerized analysis includes analysis of respective states of traffic signals along the suggested driving routes.

14. The system of claim 8, wherein the one or more computer processors are further configured to transmit, by the communication interface unit to the user computing device, information indicative of a suggested acceleration or deceleration of the user's vehicle.

* * * * *